United States Patent
Harada et al.

(10) Patent No.: US 6,580,237 B2
(45) Date of Patent: Jun. 17, 2003

(54) DIRECT-CURRENT MOTOR AND MANUFACTURING METHOD OF THE SAME

(75) Inventors: Hiroyuki Harada, Hamamatsu (JP); Takeshi Tanaka, Toyohashi (JP)

(73) Assignee: Asmo Co., Ltd, Shizuoka-ken (JP)

( * ) Notice: Subject to any disclaimer, the term of this patent is extended or adjusted under 35 U.S.C. 154(b) by 4 days.

(21) Appl. No.: 10/027,172

(22) Filed: Dec. 20, 2001

(65) Prior Publication Data

US 2002/0105294 A1 Aug. 8, 2002

(30) Foreign Application Priority Data

Dec. 25, 2000 (JP) .................................. 2000-392526
Dec. 25, 2000 (JP) .................................. 2000-392527

(51) Int. Cl.$^7$ ............................................. H02K 23/00
(52) U.S. Cl. .................. 318/254; 318/541; 318/542; 318/138; 318/439; 388/835
(58) Field of Search ................. 318/254, 138, 318/439, 541, 542; 388/835, 800; 310/70

(56) References Cited

U.S. PATENT DOCUMENTS

| | | | |
|---|---|---|---|
| 4,112,320 A | | 9/1978 | Mohr |
| 4,459,518 A | * | 7/1984 | Chevallier ............... 318/286 |
| 5,090,082 A | * | 2/1992 | Alber et al. ............ 15/250.17 |
| 5,654,616 A | | 8/1997 | Suriano et al. ............ 318/443 |
| 6,047,104 A | * | 4/2000 | Cheng ...................... 388/835 |

FOREIGN PATENT DOCUMENTS

| | | |
|---|---|---|
| DE | 16 13 198 A1 | 5/1970 |
| FR | 2 791 486 A1 | 9/2000 |

OTHER PUBLICATIONS

Hameyer, Kay et al., "Permanent Magnet Excited Brushed DC Motors," *IEEE Transactions on Industrial Electronics*, vol. 43, No. 2, Apr. 1996, pp. 247–255.
Corresponding Japanese Unexamined Patent Publication No. 10–506859.

* cited by examiner

*Primary Examiner*—Karen Masih
(74) *Attorney, Agent, or Firm*—Crompton, Seager & Tufte, LLC

(57) ABSTRACT

A direct-current motor is provided with an armature, which includes a core and coils, a commutator, which has segments, a first, second, and third brushes, and a pair of magnets. The core includes teeth, which form teeth groups. The tooth located at the most advancing end in a teeth group in the rotation direction of the armature is the most advancing tooth. Each coil is wound about one of the teeth groups. One of the magnets includes a reverse flux portion. When the third brush starts to establish a short circuit between an adjacent pair of the segments during the rotation of the armature, the most advancing end of the most advancing tooth in the teeth group that corresponds to the coil connected to the pair of the segments starts circumferentially overlapping the reverse flux portion. This suppresses the interference caused by a short circuit established by the third brush.

22 Claims, 17 Drawing Sheets

# DIRECT-CURRENT MOTOR AND MANUFACTURING METHOD OF THE SAME

BACKGROUND OF THE INVENTION

The present invention relates to a direct-current motor and a manufacturing method of the same.

A direct-current motor is generally used for driving wipers of a vehicle. One type of direct-current motors has three brushes to change the rotational speed of the motor. When the motor is in a normal operation, or running at a low speed, current is supplied to armature coils through a First brush and a second brush. When the motor is running at a high speed, current is supplied to the armature coils through the second brush and a third brush.

The direct-current motor includes a commutator, which is formed of a number of segments. The ends of each coil are connected to an adjacent pair of the segments, respectively The first, second, and third brushes slide along the commutator. While the motor is in a normal operation using the first and the second brushes, the flowing direction of the current through each coil is switched when a boundary of an adjacent pair of the segments, to which the coil is connected, passes each of the first and the second brushes. The switching of the flowing direction of current through each coil is referred to as the commutation. During the commutation, each of the first and the second brushes contacts an adjacent pair of the segments at the same time and establishes a short circuit in the coil connected to the pair of the segments. The period during which the coil is short-circuited is referred to as the commutation period.

When the third brush contacts an adjacent pair of the segments at the same time, while the direct-current motor is in a normal operation, the coil that is connected to the pair of the segments is short circuited through the third brush. At this time, great current instantly flows through the coil connected to the pair of the segments. The great current flows due to the induced electromotive force in the opposite direction to the flowing direction of current before the short circuit is established.

A graph in FIG. 26 shows the fluctuations of current that flows through one of the coils when the direct-current motor is in a normal operation using the first and the second brushes. Peaks A2, B2 of the current in the graph show abrupt changes in the current when the third brush establishes a short circuit between an adjacent pair of the segments to which the coil is connected. The third brush discharges sparks at the peaks A2, B2 of the current. The sparks produce noise and wear the third brush. Therefore, a member such as a coil (inductor) and a condenser need to be provided in the drive circuit of the motor for reducing noise. This increases the number of parts and the cost of the motor.

As shown by continuous lines C2, D2 in the graph of FIG. 26, when the commutation is performed in one of the coils while the motor is in the normal operation, the reactance voltage is generated in the coil. The reactance voltage delays change of the flowing direction of current. As a result, the current abruptly changes at the termination of the commutation period and the commutation is riot reliably performed.

SUMMARY OF THE INVENTION

The objective of the present invention is to provide a direct-current motor that suppresses the drawbacks caused by a short circuit, reliably performs commutation, and reduces the number of parts and cost. The present invention also provides a method for manufacturing the direct-current motor.

To achieve the foregoing objective, the present invention provides a direct-current motor including an armature, a commutator, a first, second, and third brushes, and a pair of magnets. The armature includes a core and a plurality of coils. The core has a plurality of teeth, which are spaced apart by a predetermined angular pitch. The teeth form a plurality of teeth groups, each of which includes a predetermined number of teeth. The tooth that is at the most advancing end in each teeth group in the rotation direction of the armature is the most advancing tooth. Each coil is wound about one of the teeth groups. The commutator integrally rotates with the armature. The commutator includes a plurality of segments. Each coil is connected to an adjacent pair of the segments. The first brush, the second brush, and the third brush are arranged about the rotational axis of the armature at predetermined angular intervals. The brushes can contact each segment to supply current to the coils through the segments. When current is supplied to the coils through the first brush and the second brush, the armature is rotated in a first mode. When current is supplied to the coils through the second brush and the third brush, the armature is rotated in a second mode. The pair of magnets face each other with the armature in between. One of the magnets has a magnetic flux change portion at a circumferential section of the magnet. When the third brush starts to establish a short circuit between an adjacent pair of the segments during the rotation of the armature, the most advancing end of the most advancing tooth in the teeth group that corresponds to the coil connected to the pair of the segments starts circumferentially overlapping the magnetic flux change portion. The circumferential dimension of the magnetic flux portion corresponds to the angle by which the armature rotates while the third brush establishes a short circuit between an adjacent pair of the segments.

The present invention also provides a direct-current motor including an armature, a commutator, a first, second and third brushes, and a pair of magnets. The armature includes a core and a plurality of coils. The core has a plurality of teeth, which are spaced apart by a predetermined angular pitch. The teeth form a plurality of teeth groups, each of which includes a predetermined number of teeth. The tooth that is at the most trailing end in each teeth group in the rotation direction of the armature is the most trailing tooth. Each coil is wound about one of the teeth groups. The commutator integrally rotates with the armature. The commutator includes a plurality of segments. Each coil is connected to an adjacent pair of the segments. The first brush, the second brush, and the third brush are arranged about the rotational axis of the armature at predetermined angular intervals. The brushes can contact each segment to supply current to the coils through the segments. When current is supplied to the coils through the first brush and the second brush, the armature is rotated in a first mode. When current is supplied to the coils through the second brush and the third brush, the armature is rotated in a second mode. The pair of magnets face each other with the armature in between. One of the magnets has a magnetic flux change portion at a circumferential section of the magnet. When the third brush starts to establish a short circuit between an adjacent pair of the segments during the rotation of the armature, the most trailing end of the most trailing tooth in the teeth group that corresponds to the coil connected to the pair of the segments starts circumferentially overlapping the magnetic flux change portion. The circumferential dimension of the magnetic flux portion corresponds to the angle by which the armature rotates while the third brush establishes a short circuit between an adjacent pair of the segments.

A further aspect of the present invention is a direct-current motor including an armature, a commutator, a first, second, and third brush, a pair of magnets, and a second magnetic flux change portion. The armature includes a core and a plurality of coils. The core has a plurality of teeth, which are spaced apart by a predetermined angular pitch. The teeth form a plurality of teeth groups, each of which includes a predetermined number of teeth. The tooth that is at the most advancing end in each teeth group in the rotation direction of the armature is the most advancing tooth. Each coil is wound about one of the teeth groups. The commutator integrally rotates with the armature. The commutator includes a plurality of segments. Each coil is connected to an adjacent pair of the segments. The first brush, the second brush, and the third brush are arranged about the rotational axis of the armature at predetermined angular intervals. The brushes can contact each segment to supply current to the coils through the segments. When current is supplied to the coils through the first brush and the second brush, the armature is rotated in a first mode. When current is supplied to the coils through the second brush and the third brush, the armature is rotated in a second mode. The pair of magnets face each other with the armature in between. Each magnet includes a main portion and an extended portion, which extends from the main portion. The extended portion includes a first magnetic flux change portion. The magnetic flux at the first magnetic flux change portion gradually increases toward the rotation direction of the armature. The second magnetic flux change portion extends circumferentially in a part of one of the main portions. When the third brush starts to establish a short circuit between an adjacent pair of the segments during the rotation of the armature, the most advancing end of the most advancing tooth in the teeth group that corresponds to the coil connected to the pair of the segments starts circumferentially overlapping the magnetic flux change portion.

The present invention also provides a direct-current motor including an armature, a commutator, a first, second, and third brush, a pair of magnets, and a second magnetic flux change portion. The armature includes a core and a plurality of coils. The core has a plurality of teeth, which are spaced apart by a predetermined angular pitch. The teeth form a plurality of teeth groups, each of which includes a predetermined number of teeth. The tooth that is at the most trailing end in each teeth group in the rotation direction of the armature is the most trailing tooth. Each coil is wound about one of the teeth groups. The commutator integrally rotates with the armature. The commutator includes a plurality of segments. Each coil is connected to an adjacent pair of the segments. The first brushy the second brush, and the third brush are arranged about the rotational axis of the armature at predetermined angular intervals. The brushes can contact each segment to supply current to the coils through the segments. When current is supplied to the coils through the first brush and the second brush, the armature is rotated in a first mode. When current is supplied to the coils through the second brush and the third brush, the armature is rotated in a second mode. The pair of magnets face each other with the armature in between. Each magnet includes a main portion and an extended portion, which extends from the main portion. The extended portion includes a first magnetic flux change portion. The magnetic flux at the first magnetic flux change portion gradually increases toward the rotation direction of the armature. The second magnetic flux change portion extends circumferentially in a part of one of the main portions. When the third brush starts to establish a short circuit between an adjacent pair of the segments during the rotation of the armature, the most trailing end of the most trailing tooth in the teeth group that corresponds to the coil connected to the pair of the segments starts circumferentially overlapping the magnetic flux change portion.

The present invention also provides a method for a direct-current motor. The motor includes an armature, a commutator, a first, second, and third brush, and a pair of magnets. The armature includes a core and a plurality of coils. The commutator integrally rotates with the armature. The commutator includes a plurality of segments. Each coil is connected to an adjacent pair of the segments. The first brush, the second brush, and the third brush are arranged about the rotational axis of the armature at predetermined angular intervals. The brushes can contact each segment to supply current to the coils through the segments. When current is supplied to the coils through the first brush and the second brush, the armature is rotated in a first mode. When current is supplied to the coils through the second brush and the third brush, the armature is rotated in a second mode. The pair of magnets face each other with the armature in between. The manufacturing method includes a first polarization process and a second polarization process. In the first polarization process, the magnets are exposed to a part of a magnetic field having a generally uniform direction and a generally uniform force, so that the magnets have the magnetic flux having a generally uniform direction and a generally uniform force. In the second polarization process, a part of one of the magnets is exposed to a part of a magnetic field having a generally opposite direction to the magnetic field generated in the first polarization process, thus forming a magnetic flux change portion at a circumferential section of the magnet. The magnetic flux generated in the magnetic flux change portion suppresses the electromotive force induced in the coil due to a short circuit established between an adjacent pair of the segments by the third brush during the rotation of the armature in the first mode.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
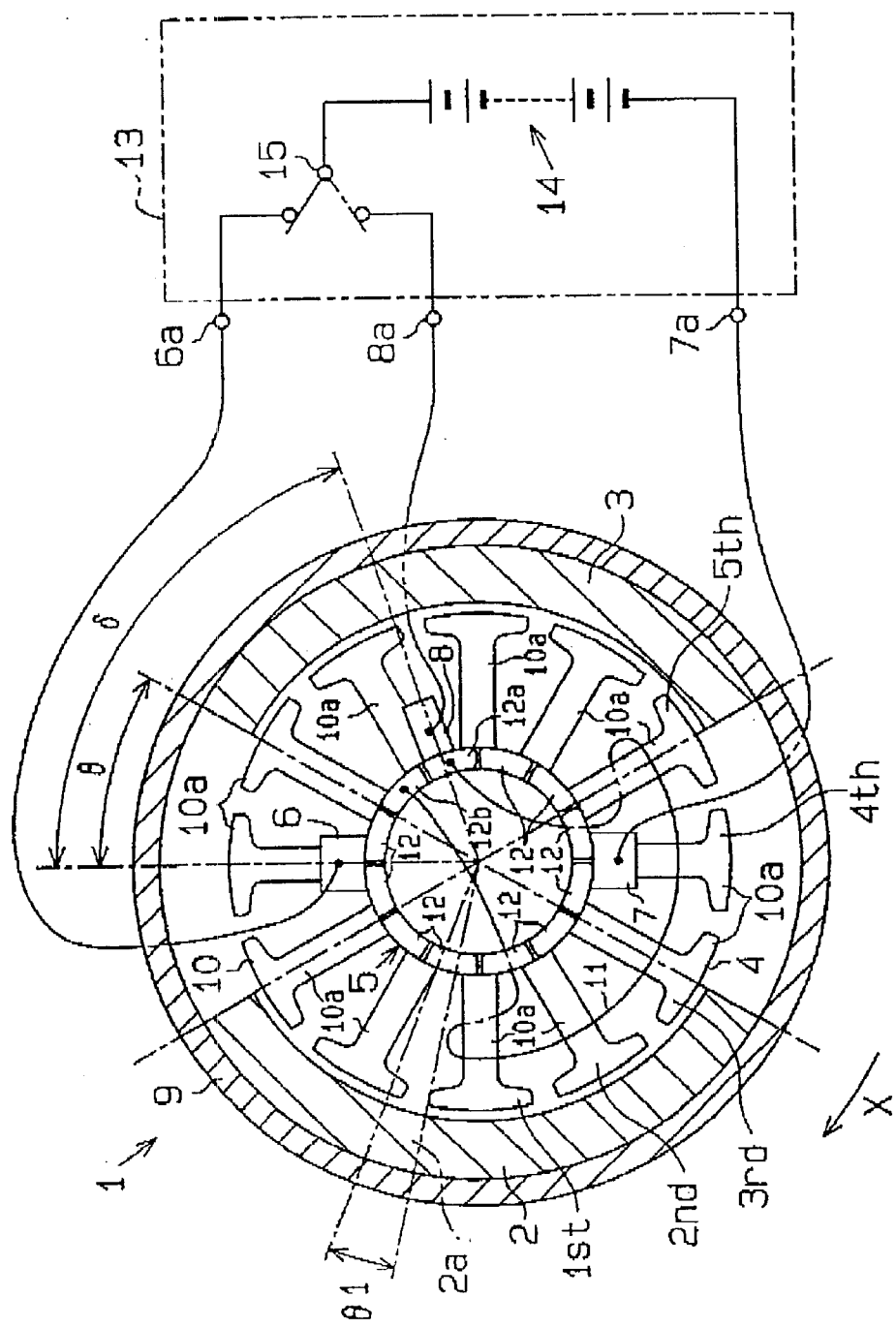
FIG. 1 is a cross-sectional view illustrating a direct-current motor according to a first embodiment of the present invention.

A first embodiment of the present invention will now be described with reference to FIGS. 1 to 5. FIG. 1 is a cross-sectional view of a direct-current motor 1. The direct-current motor 1 is used as, for example, a wiper motor, which drives wipers of a vehicle in a suitable manner.

As shown in FIG. 1, the direct-current motor, or the wiper motor 1, includes a pair of magnets 2, 3, an armature 4, commutator 5, and three brushes 6, 7, 8.

Specifically, the wiper motor 1 is a bipolar direct-current motor and has a motor housing yoke 9. The magnets 2, 3, which form a north pole and a south pole, face each other with the armature 4 in between. The magnets 2, 3 are symmetrical with respect to the center of the armature 4. Therefore, for purposes of illustration, the structure related to the magnet 2 will be described. The armature 4 includes a core 10 and coils 11 wound about the core 10. To rotate the armature 4, current is supplied to the coils 11.

The armature core 10 has teeth 10a, the number of which is twelve in this embodiment. Also, the number of the coils 11 is twelve in this embodiment. Each tooth 10a has a bar at the distal end. The tooth bars extend in the circumferential direction. In this embodiment, each consecutive five teeth 10a form a group, and there are twelve groups of the teeth 10a. Specifically, any one of the teeth 10a is located at the most advancing position in the rotation direction X in one of the teeth groups, and the tooth 10a at the second advancing position in this group is also the most advancing tooth 10a in the next group. In this manner, each tooth 11a is defined as the most advancing tooth to the most trailing tooth 10a, or the first to fifth tooth 1st, 2nd, 3rd, 4th, and 5th in five consecutive teeth groups. Each coil 11 is wound about one of the teeth groups. Only one of the coils 11 is shown in FIG. 1. The teeth 10a are spaced apart by thirty-degree intervals. Therefore, the angle defined by each adjacent pair of the teeth 10a is 30°. In other words, the armature slot angle θ is 30°(30°=360°/12). This winding structure is referred to as distributed winding.

The commutator 5 is located at one side of the armature 4 and includes twelve segments 12. In this embodiment, twelve segments 12 are spaced apart by thirty-degree intervals. Each coil 11 is wound about one of the groups of the teeth 10a. Each end of the coil 11 is connected to one of an adjacent pair of the segments 12 that are substantially opposite to the corresponding group of teeth 10a with respect to the axis of the commutator 5. For example, each end of the coil 11 is connected to one of the segments 12a, 12b in FIG. 1.

Three brushes 6, 7, 8 are urged to contact the commutator 5. First and second brushes 6, 7 are spaced apart by 180 degrees about the axis of the commutator 5. The third brush B is spaced apart from the first brush 6 by a predetermined angle δ in the rotation direction X of the armature 4. The predetermined angle δ is an acute angle. Each brush 6, 7, 8 is connected to a direct-current power supply circuit 13 through a corresponding terminal 6a, 7a, The direct-current power supply circuit 13 has a direct-current power supply 14 and a selector switch 15 The first brush 6 and the third brush 3 are selectively connected to the positive pole of the direct-current power supply 14 through the corresponding terminal 6a, 8a and the selector switch 15. The second brush 7 is always connected to the negative pole of the direct-current power supply 14 through the terminal 7a. The selector switch 15 selects one of the first brush 6 and the third brush 8 for the direct-current power supply 14. When the first brush 6 is connected to the direct-current power supply 14, current is supplied to the motor 1 through the first brush 6 and the second brush 7. When the third brush 8 is connected to the direct-current power supply 14, current is supplied to the motor 1 through the second brush 7 and the third brush 8.

In the present invention, when the motor is in a normal operation, or running at a low speeds the selector switch 15 connects the first brush 6 to the direct-current power supply 14. When the motor is running at a high speed, the selector switch 15 connects the third brush 8 to the direct-current power supply 14.

The direct-current power supply 14 supplies direct current to the coils 11 through one of the first and the third brushes 8 selected by the selector switch 15, the second brush 7, and the commutator 5. Then, the armature 4 rotates clockwise as viewed in FIG. 1, or in the direction indicated by the arrow X. The commutator 5 rotates with the armature 4.

When the commutator 5 rotates, the connecting state of the brushes 6, 7, 8 with respect to the segments 12 of the commutator 5 changes. In the state shown in FIG. 1, each of the first brush 6 and the second brush 7 is in contact with an adjacent pair of the segments 12 so that a short circuit is established between the two segments 12. The third brush 8 contacts only one segment 12 (the segment 12a in FIG. 1). When the commutator 5 further rotates with the armature 4, the third brush 8 contacts an adjacent pair of the segments 12a, 12b so that a short circuit is established between the two segments 12a, 12b.

When the motor is in a normal operation, or running at a low speed, the flowing direction of current through each coil 11 is switched when a boundary of a pair of the segments 12 that is connected to the corresponding coil 11 passes along the first or the second brush 6, 7. In other words the flowing direction of current through each coil 11 is switched after the first or the second brush 6, 7 establishes a short circuit between an adjacent pair of the segments 12 to which the coil 11 is connected. The switching of the flowing direction of current through each coil 11 is referred to as the commutation. When the motor 1 is running at a high speed using the second and the third brushes 7, 8, the commutation is performed in the same manner as when the motor 1 is in a normal operation.

The magnet 2 (3) extends in the circumferential direction and corresponds to, for example, the slot angle θ multiplied by an integer. In this embodiment, the length of the magnet 2 (3) corresponds to 120° (4θ).

Figure 2:
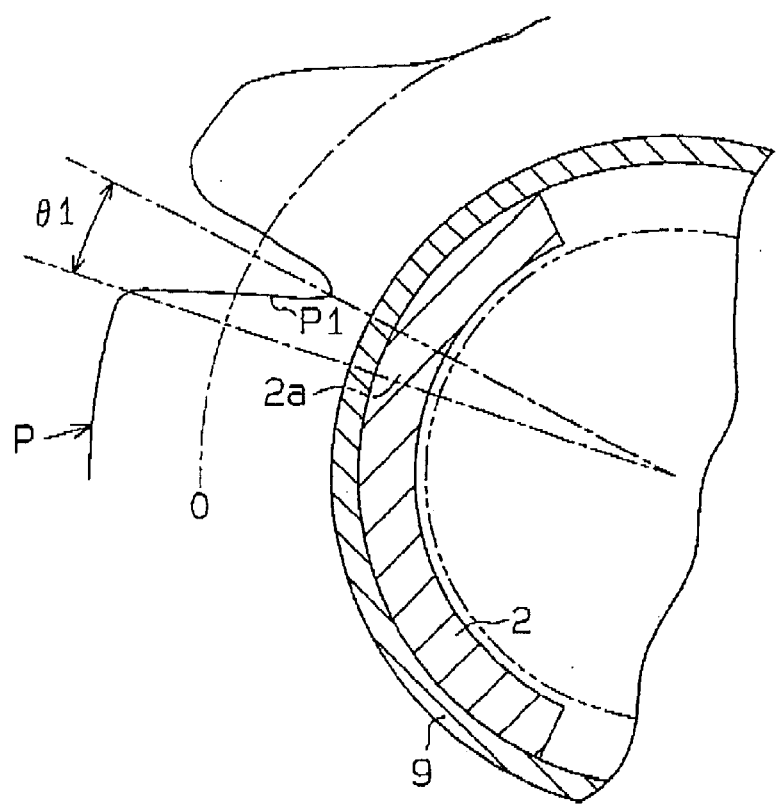
FIG. 2 is an explanatory diagram illustrating the magnetic flux distribution of the magnet provided in the direct-current motor shown in FIG. 1.

The magnet 2 has a magnetic flux change portion, that is, a reverse flux portion 2a, as shown by double-dotted lines in FIGS. 1 and 2. A curved line P in FIG. 2 shows that magnetic flux is generated in the opposite direction in the reverse flux portion 2a with respect to the other part of the magnet 2 adjacent to the reverse flux portion 2a (part P1 in FIG. 2). In this embodiment, the reverse flux portion 2a is located on the advanced side from the middle part of the magnet 2 in the rotation direction X of the armature 4, As shown in FIG. 2, in the first embodiment, the magnetic flux density of the reverse flux portion 2a is maximum at the most advancing position of the reverse flux portion 2a with respect to the rotation direction X of the armature 4. However, the magnetic flux density of the reverse flux portion 2a may be maximum at the middle of the reverse flax portion 2a.

The most advancing tooth 10a in the rotation direction X of the armature 4 in each teeth group is referred to as a first tooth (most advancing tooth) 1st. When the armature 4 rotates and the third brush 8 starts to establish a short circuit between an adjacent pair of the segments 12, the first tooth 1st in a teeth group about which the coil 11 connected to the pair of the segments 12 is wound starts circumferentially overlapping the reverse flux portion 2a.

In FIG. 1, the third brush 8 is contacting only one of the segments 12a. The third brush 8 is at a position immediately before establishing a short circuit between the segment 12a and the adjacent segment 12b. In this state, the first tooth 1st in a teeth group that corresponds to the coil 11 connected to the segments 12a, 12b starts circumferentially overlapping the reverse flux portion 2a. More specifically, the most advancing end of the tooth bar is aligned with the reverse flux portion 2a.

The circumferential dimension of the reverse flux portion 2a corresponds to the angle θ1 by which the armature 4 rotates while the third brush 8 establishes a short circuit between an adjacent pair of the segments 12.

Figure 3:
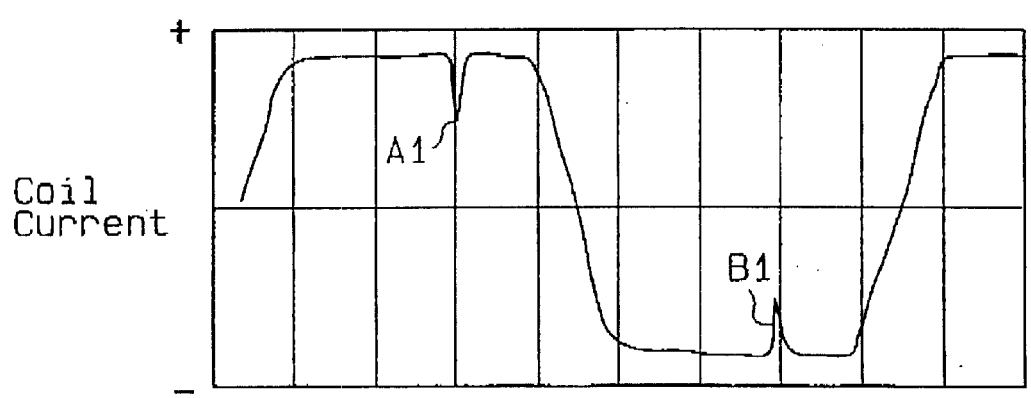
FIG. 3 is a graph showing the fluctuations of current that flows through the armature coils shown in FIG. 1.

The graph in FIG. 3 shows the fluctuations of current that flows through one of the coils 11 when the motor 1 is running at a low speed using the first brush 6 and the second brush 7. Peaks A1, B1 in the graph show the fluctuations of current when a short circuit is established by the third brush 8 between an adjacent pair of the segments 12 that are connected to the corresponding coil 11.

When a short circuit is established between an adjacent pair of the segments 12 through the third brush 8, great current instantly flows through the coil 11 connected to the pair of the segments 12. The great current flows due to the induced electromotive force in the opposite direction to the flowing direction of current before a short circuit is established. However, in this embodiment, when the armature 4 rotates and the third brush 8 starts to establish a short circuit between an adjacent pair of the segments 12, the most advancing end of the first tooth 1st in a teeth group that corresponds to the coil 11 connected to the pair of the segments 12 starts circumferentially overlapping the reverse flux portion 2a. The magnetic flux, which is generated in the reverse flux portion 2a, generates voltage in the corresponding coil 11. The voltage suppresses the electromotive force, which is induced in the corresponding coil 11 due to a short circuit. Therefore, the reverse flux portion 2a suppresses the electromotive force, which is induced in the corresponding coil 11 due to a short circuit established between two segments 12. As a result, the peaks A1, B1 of current shown by the graph in FIG. 3 are smaller compared with the peaks A2, 52 of current according to the prior art shown by the graph in FIG. 26.

The polarization procedure of magnets 2, 3 will now be described with reference to FIGS. 4 and 5. The polarization procedure of the magnets 2, 3 includes a first polarization process, in which the entire magnets 2, 3 are uniformly polarized, and the second polarization process, in which a part of the magnet 2 is polarized.

Figure 4:
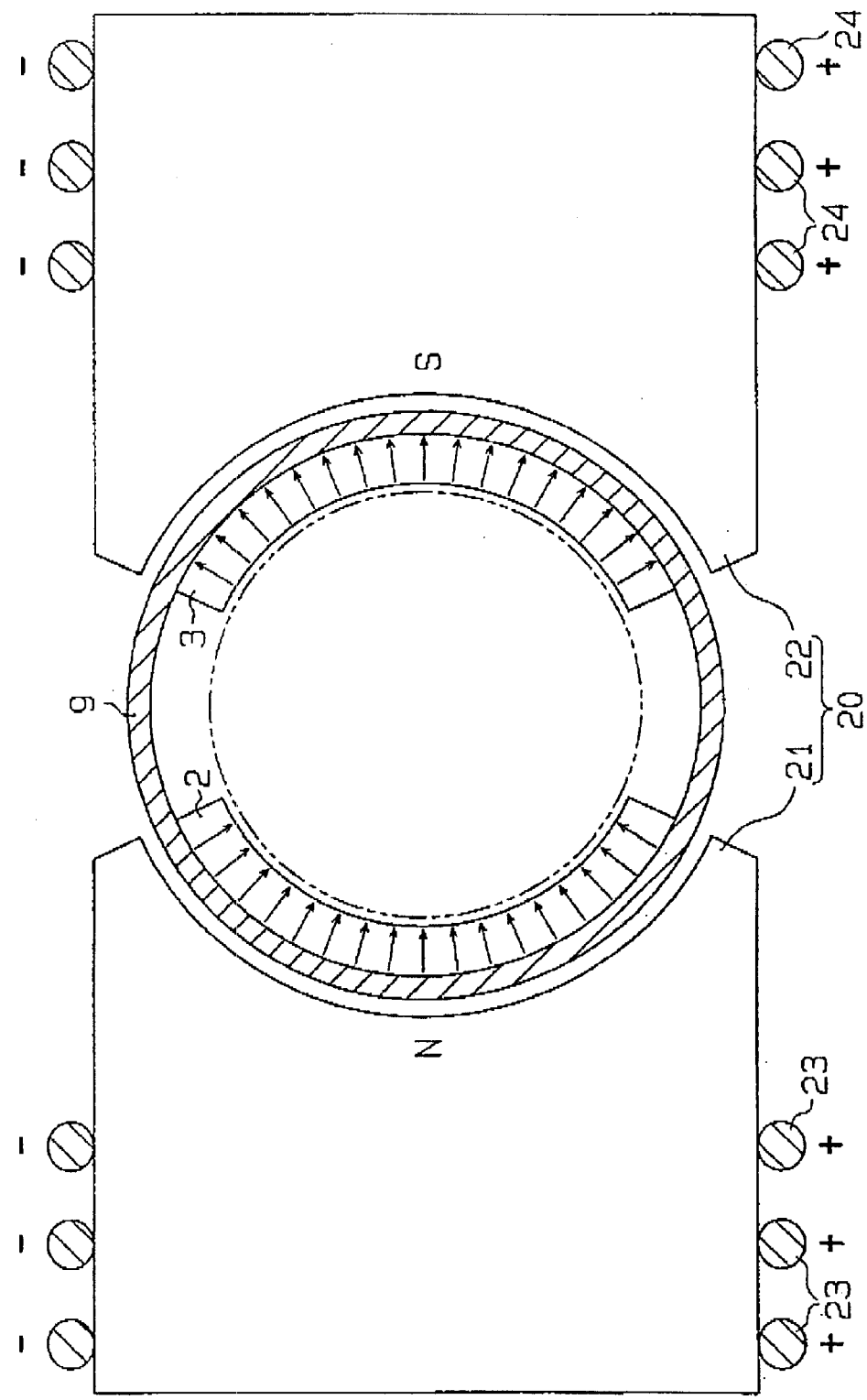
FIG. 4 is a diagrammatic view illustrating a first polarization process of the magnets.

In the first polarization process, the magnets 2, 3 are polarized by a main polarization apparatus 20 as shown in FIG. 4. Specifically, the main polarization apparatus 20 has a first polarization yoke 21 and a second polarization yoke 22. Each of the first polarization yoke 21 and the second polarization yoke 22 has an end surface, which faces the outer circumferential surface of the motor housing yoke 9. The radius of curvature of each end surface is greater than that of the outer circumferential surface of the motor housing yoke 9. The first and the second polarization yokes 21, 22 are arranged to face the magnets 2, 3, respectively, such that the first and the second polarization yokes 21, 22 surround the motor housing yoke 9. A first coil 23 is wound about the first polarization yoke 21 and a second coil 24 is wound about the second polarization yoke 22.

Current flows through the first coil 23 and the second coil 24 from the side indicated with "+" to the side indicated with "−" in FIG. 4. Then, each of the magnets 2, 3 located between the first polarization yoke 21 and the second polarization yoke 22 is exposed to a part of a magnetic field having a generally uniform direction and a generally uniform force. As a result, the direction of the magnetic flux of the magnets 2, 3 is generally uniform and the magnetic flux density is generally uniform.

Second Polarization Process

Figure 5:
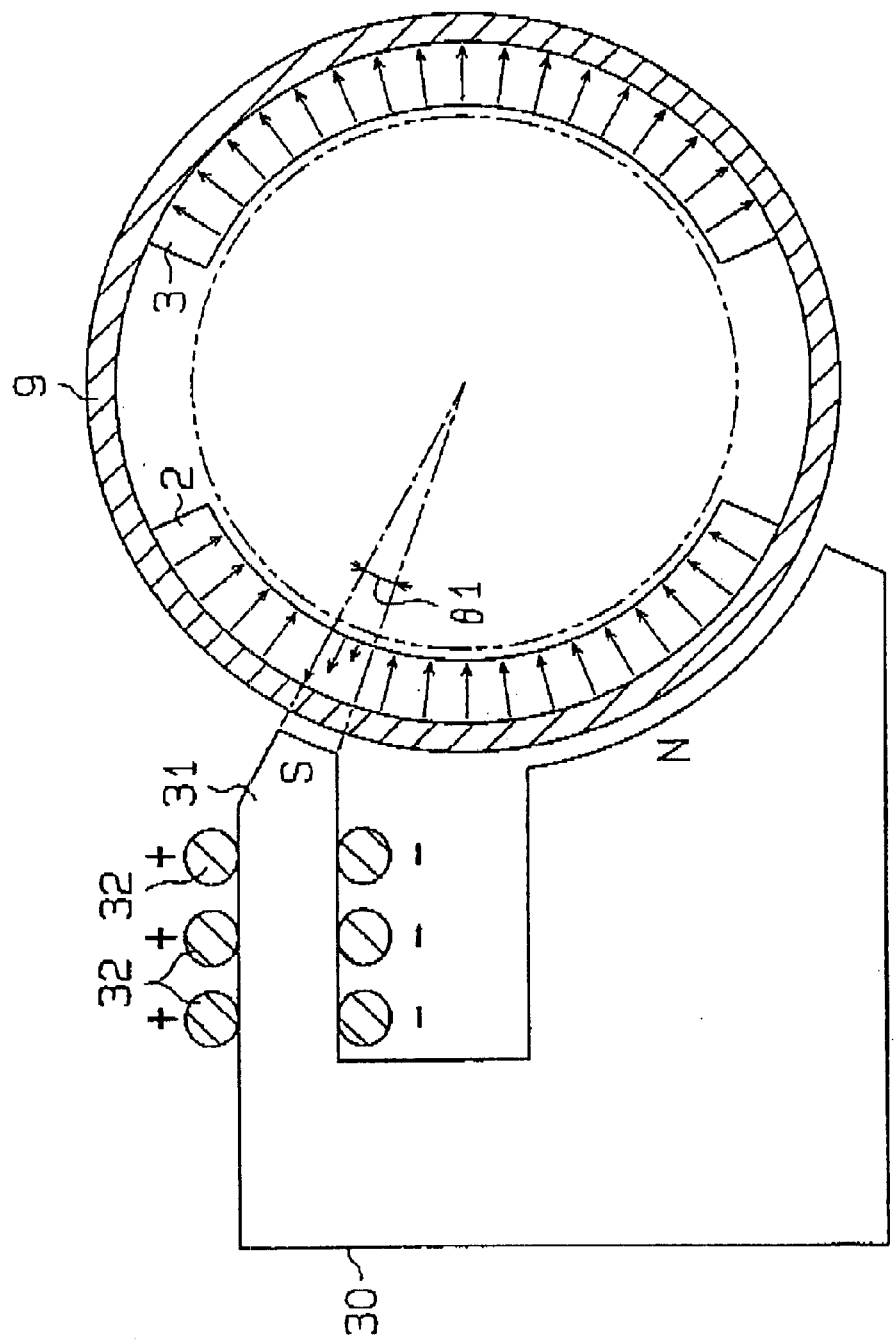
FIG. 5 is a diagrammatic view illustrating a second polarization process of the magnets.

In the second polarization process, the magnet 2 is partially polarized by a sub-polarization apparatus 30 as shown in FIG. 5. Specifically, the sub-polarization apparatus 30 has a sub-polarization yoke 31 for forming the reverse flux portion 2a on the magnet 2. The sub-polarization yoke 31 has a distal end surface, which faces the outer circumferential surface of the motor housing yoke 9. The radius of curvature of the distal end surface is greater than that of the outer circumferential surface of the motor housing yoke 9. The width of the distal end surface of the sub-polarization yoke 31 is equivalent to the circumferential dimension of the reverse flux portion 2a to be formed, that is, the angle θ1 by which the armature 4 rotates while the third brush 8 establishes a short circuit between an adjacent pair of the segments 12. The sub-polarization yoke 31 is arranged to align with the part of the magnet 2 at which the reverse flux portion 2a is formed. A sub coil 32 is wound about the sub-polarization yoke 31.

Current flows through the sub-coil 32 from the side indicated with "+" to the side indicated with "−" in FIG. 5. Then, a part of the magnet 2 that faces the distal end surface of the sub-polarization yoke 31 is exposed to a part of a magnetic field having a generally opposite direction from that of the magnetic field generated in the first polarization process. As a result, the reverse flux portion 2a, which generates magnetic flux in the opposite direction from the other part, is formed on the magnet 2. The circumferential dimension of the reverse flux portion 2a is the same as the width of the distal end surface of the sub-polarization yoke 31. In other words, the circumferential dimension of the reverse flux portion 2a corresponds to the angle θ1 by which the armature 4 rotates while the third brush 8 establishes a short circuit between adjacent pair of the segments 12.

The preferred embodiment provides the following advantages.

(1) When the armature 4 rotates and the third brush 8 starts to establish a short circuit between an adjacent pair of the segments 12, the first tooth 1st of a teeth group that corresponds to the coil 11 connected to the pair of the segments 12 starts circumferentially overlapping the reverse flux portion 2a. Therefore, the reverse flux portion 2a suppresses the electromotive force, which is induced in the corresponding coil 11 due to a short circuit caused between the pair of the segments 12. Therefore, the sudden current fluctuations in the opposite direction are avoided.

As a result, the third brush 8 is prevented from discharging sparks, and noise of the motor 1 and wears of the third brush 8 are reduced. Therefore, a part such as a coil (inductor) and a condenser need not be provided in the drive circuit of the motor 1 for reducing noise. This reduces the number of parts and the cost of the motor 1.

(2) The interference of current due to a short circuit by the third brush 8 is reduced only by providing the reverse flux portion 2a on the magnet 2. Therefore, the manufacturing procedure is simple and the cost is reduced.

(3) The magnets 2, 3 are formed by the first polarization process, in which the entire magnets 2, 3 are exposed to a part of a magnetic field having a generally uniform direction, and the second polarization process, in which a part of the magnet 2 is exposed to a part of a magnetic field having a generally opposite direction from the magnetic field generated in the first polarization process. Therefore, the reverse flux portion 2a is formed by a simple procedure and the cost of the motor 1 is reduced.

Second Embodiment

A second embodiment of the present invention will now be described with reference to FIGS. 6 and 7. The differences from the first embodiment illustrated in FIGS. 1 to 5 will mainly be discussed below.

Figure 6:
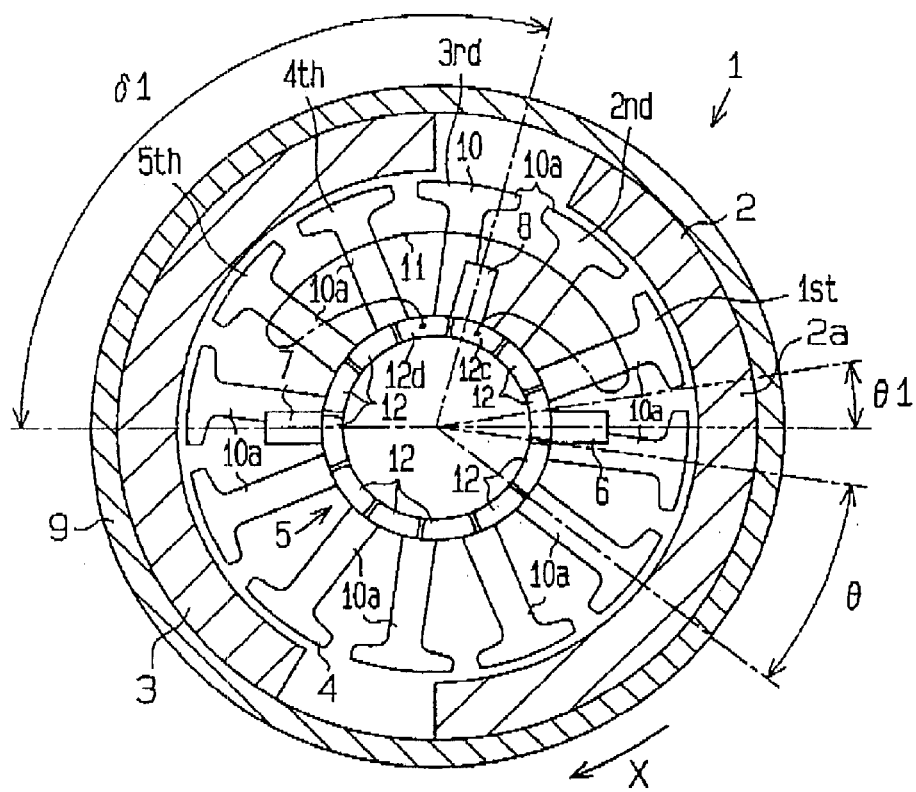
FIG. 6 is a cross-sectional view illustrating a direct-current motor according to a second embodiment of the present invention.

As shown in FIG. 6, each coil 11 is wound about one of the teeth groups. The second embodiment differs from the first embodiment illustrated in FIGS. 1 to 5 in that each end of the coil 11 is connected to one of an adjacent pair of the segments 12 that is in the vicinity of the corresponding group of the teeth 10a. For example, the ends of one of the coil 11 shown in FIG. 6 are connected to the segments 12c and 12d.

The first and the second brushes 6, 7 are spaced apart by 180 degrees about the axis of the commutator 5 in the same manner as the first embodiment illustrated in FIGS. 1 to 5. However, the third brush 8 differs from the first embodiment illustrated in FIGS. 1 to 5 in that the third brush 8 is spaced from the second brush 7 by a predetermined angle δ1 in the rotation direction X of the armature 4. Each brush 6 to 8 is connected to the direct-current power supply circuit (not shown), which is the same as the direct-current power supply circuit 13 shown in FIG. 1.

The magnet 2 (3) differs from the embodiment illustrated in FIGS. 1 to 5 in that the magnet 2 (3) extends in the circumferential direction and corresponds to the slot angle θ multiplied by five. In the second embodiment, the length of the magnet 2 (3) corresponds to 150 degrees.

The magnet 2 includes the reverse flux portion 2a as in the embodiment illustrated in FIGS. 1 to 5. However, in the second embodiment, the reverse flux portion 2a is located on the trailing side from the middle part of the magnet 2 in the rotation direction X of the armature 4. As a result, as in the first embodiment illustrated in FIGS. 1 to 5, when the armature 4 rotates and the third brush 8 starts to establish a short circuit between an adjacent pair of the segments 12, the most advancing end of the first tooth 1st in a teeth group about which the coil 11 connected to the pair of the segments 12 is wound is aligned with an trailing end of the reverse flux portion 2a.

The circumferential dimension of the reverse flux portion 2a corresponds to the angle θ1 by which the armature 4 rotates while the third brush 8 establishes a short circuit between an adjacent pair of the segments 12 as in the first embodiment illustrated in FIGS. 1 to 5.

Figure 7:
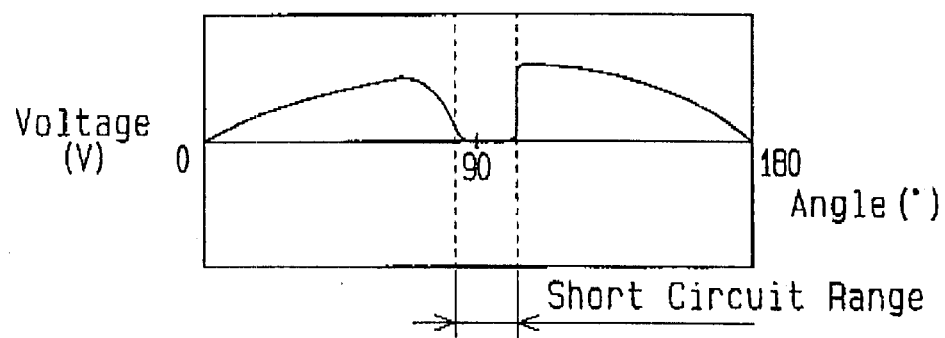
FIG. 7 is a graph showing the fluctuations of the voltage induced in one of the coil of the motor shown in FIG. 6.

A graph in FIG. 7 shows the fluctuations of voltage generated in one of the coils 11 when the motor 1 is in a normal operation mode using the first and the second brushes 6, 7. The horizontal axis of the graph shows the rotational angle of the armature 4. According to the graph, when the armature 4 rotates by 90 degrees from the rotational angle position of zero degrees, the third brush 8 establishes a short circuit between an adjacent pair of the segments 12, to which one of the coils 11 is connected. While the short circuit is established, the most advancing end of the first tooth 1st of a teeth group about which the coil 11 connected to the pair of the segments 22 is wound passes the reverse flux portion 2a. As a result, the voltage generated in the corresponding coil 11 is substantially zero while the short circuit is established.

Therefore, the second embodiment provides the same advantage as the first embodiment illustrated in FIGS. 1 to 5.

Third Embodiment

A third embodiment of the present invention will now be described with reference to FIGS. 8 and 9. The differences from the second embodiment illustrated in FIGS. 6 and 7 will mainly be discussed below.

Figure 8:
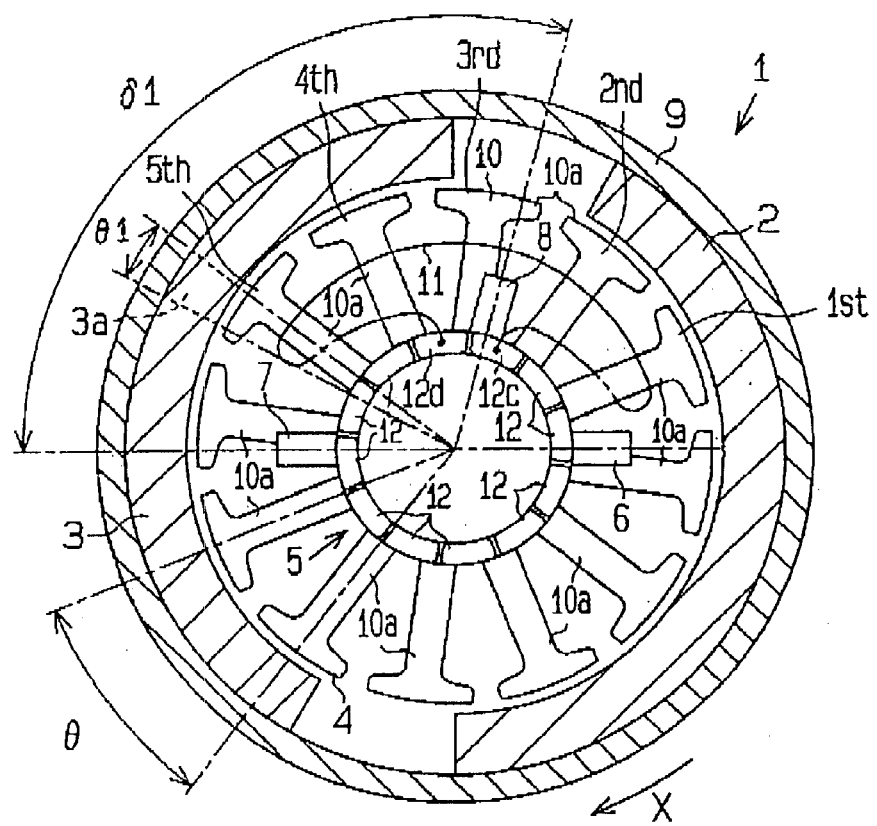
FIG. 8 is a cross-sectional view illustrating a direct-current motor according to a third embodiment of the present invention.

As shown in FIG. 8, in the third embodiment, a reverse flux portion 3a is provided on the magnet 3 instead of the magnet 2. The reverse flux portion 3a is located on the advanced side from the middle part of the magnet 3 in the rotation direction X of the armature 4. When the armature 4 rotates and the third brush 8 starts to establish a short circuit between an adjacent pair of the segments 12 (12c, 12d in FIG. 8), the fifth tooth 5th of a teeth group about which the coils 11 connected to the pair of the segments 12 is wound starts to separate from the reverse flux portion 3a. In other words, when the third brush 8 starts to establish a short circuit between an adjacent pair of the segments 12, the most trailing end of the fifth tooth 5th in a teeth group about which the coils 11 connected to the pair of the segments 12 is wound is aligned with the trailing end of the reverse flux portion 3a. As described in the first embodiment illustrated in FIGS. 1 to 5, the fifth tooth 5th is the most trailing tooth 10a in a teeth group with respect to the rotation direction X of the armature 4.

The circumferential dimension of the reverse flux portion 3a corresponds to the angle θ1 by which the armature 4 rotates while the third brush 8 establishes a short circuit between an adjacent pair of the segments 12 as in the motor 1 illustrated in FIG. 6.

Figure 9:
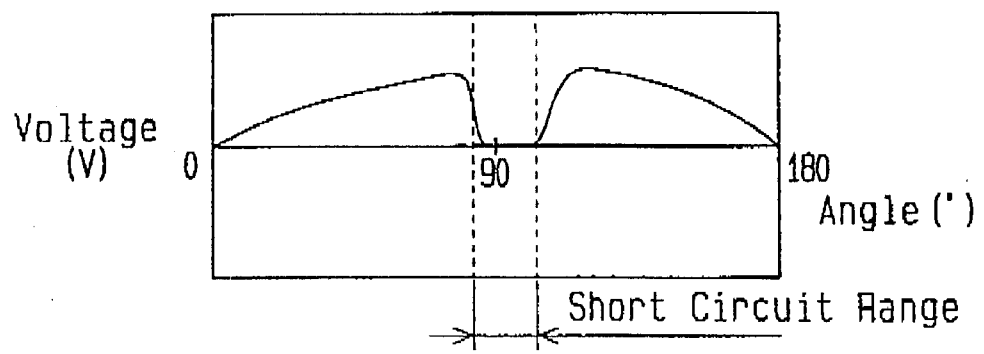
FIG. 9 is a graph showing the fluctuations of the voltage induced in one of the coil of the motor shown, in FIG. 10 is an explanatory diagram illustrating the magnetic flux distribution of a magnet provided in a direct-current motor according to a fourth embodiment of the present invention.

FIG. 9 is a graph, which corresponds to the graph in FIG. 7. According to the graph of FIG. 9, as in the graph of FIG. 7, when the armature 4 rotates by 90 degrees from the rotational angle position of zero degrees, the third brush 8 establishes a short circuit between an adjacent pair of the segments 12, to which one of the coils 11 is connected. While the short circuit is established, the fifth tooth 5th of a teeth group about which the coil 11 connected to the pair of the segments 12 is wound gradually separates from the reverse flux portion 3a. In other words, the most trailing end of the tooth bar of the fifth tooth 5th passes the reverse flux portion 3a. At this time, the magnetic flux, which is generated in the reverse flux portion 3a, generates voltage in the coil 11. The voltage cancels the electromotive force, which is induced in the coil 11 due to a short circuit. As a result, the voltage generated in the coil 11 is substantially zero while the short circuit is established.

Therefore, the third embodiment also provides the same advantages as the second embodiment illustrated in FIGS. 6 and 7.

Fourth Embodiment

Figure 10:
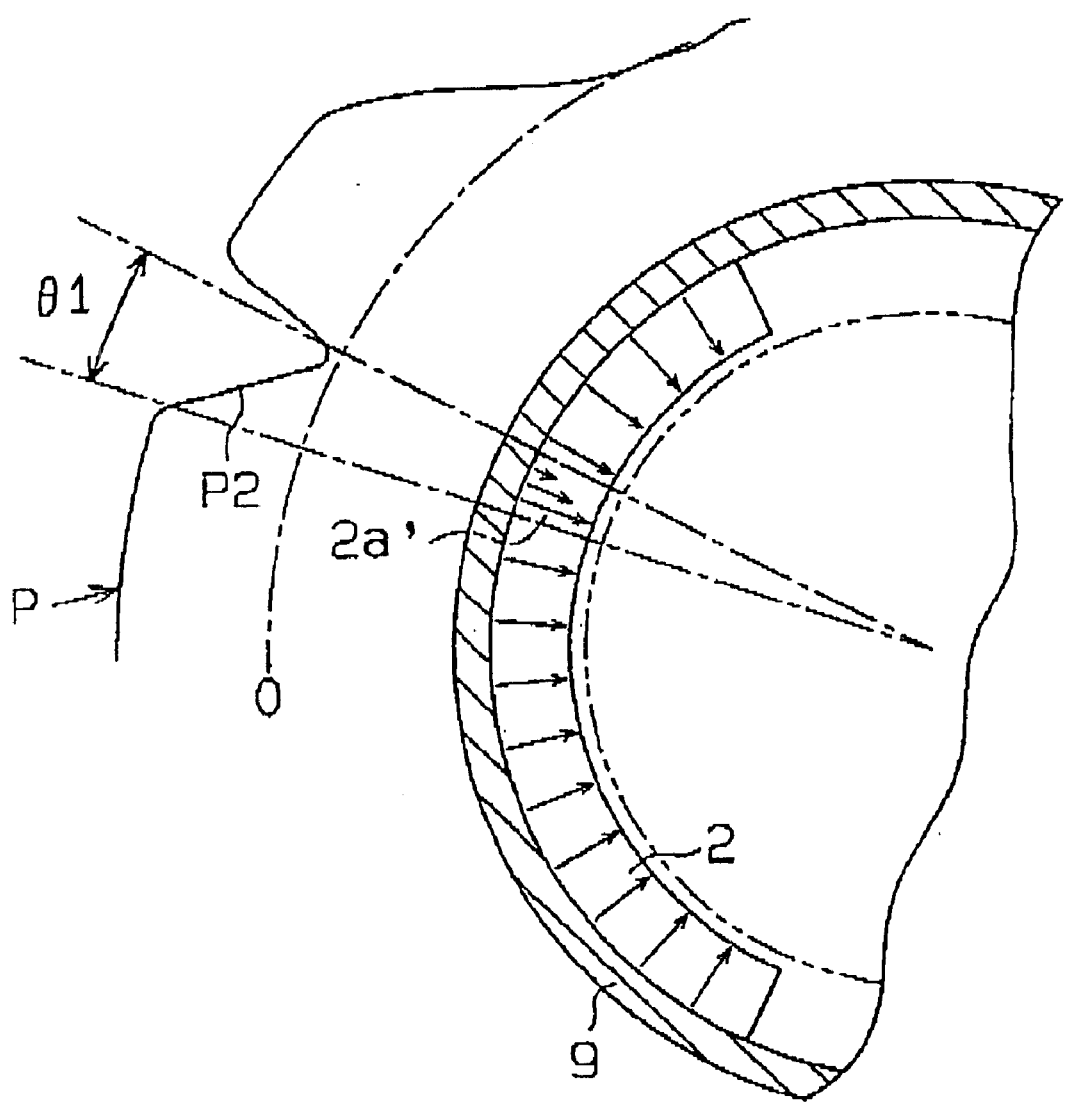

A fourth embodiment illustrated in FIG. 10 is a modification of the first embodiment illustrated in FIGS. 1 to 5. In the fourth embodiment, a weak flux portion 2a′, which is a magnetic flux change portion, is provided on the magnet 2 instead of the reverse flux portion 2a. As shown by a curved line P in FIG. 10, the weak flux portion 2a′ generates a magnetic flux, the direction of which is the same as that of the magnetic flux generated in the other part of the magnet 2. However, the magnetic flux density of the weak flux portion 2a′ is less than the magnetic flux density of the other part of the magnet 2 (see a curved line P2 in FIG. 10). This structure also provides the same advantages as the first embodiment illustrated in FIGS. 1 to 5.

The weak flux portion as shown in FIG. 10 may be provided instead of the reverse flux portion 2a, 3a in the second embodiment illustrated in FIGS. 6 to 9.

Fifth Embodiment

A fifth embodiment of the present invention will now be described with reference to FIGS. 11 to 13. The differences from the second embodiment of FIGS. 6 and 7 will mainly be discussed below.

Figure 11:
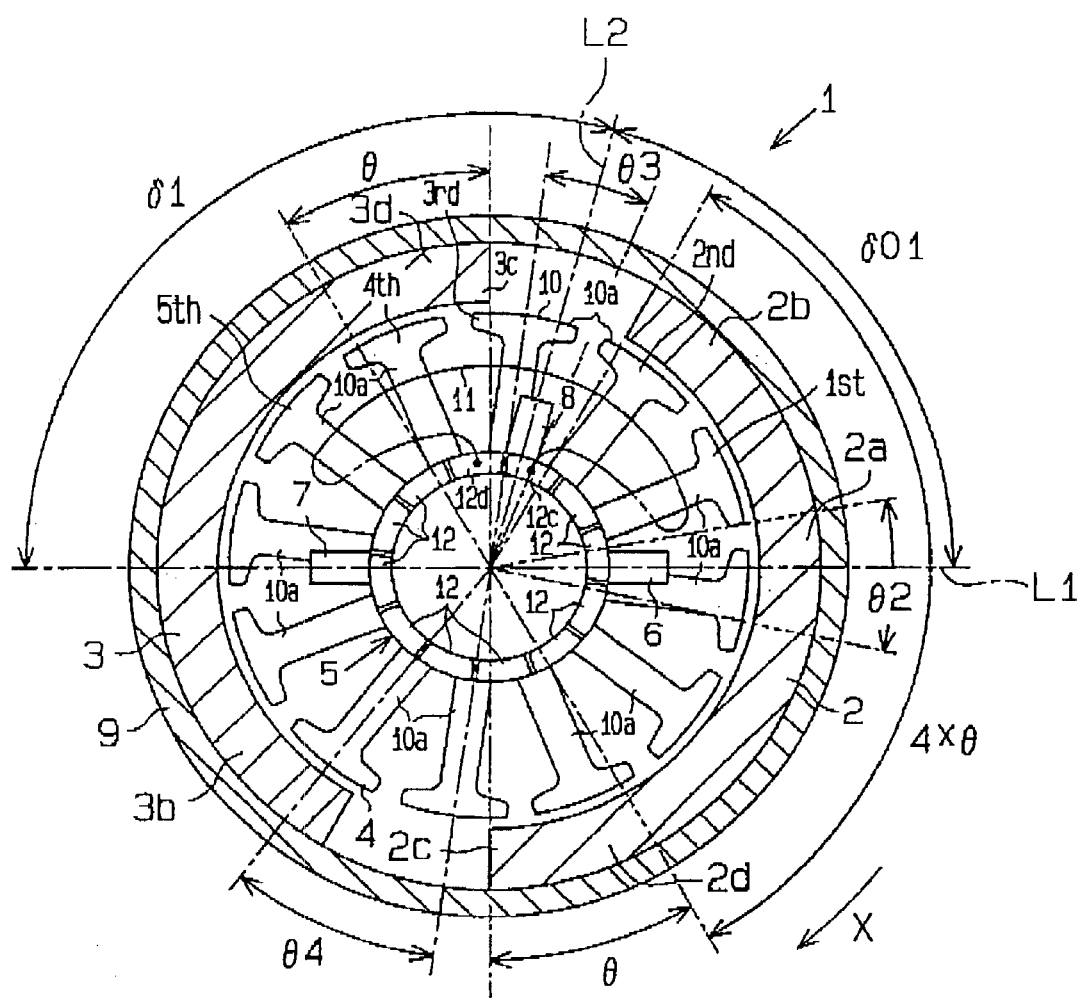
FIG. 11 is a cross-sectional view illustrating a direct-current motor according to a fifth embodiment of the present invention.

As shown in FIG. 11, in the fifth embodiment, the magnet 2 (3) includes a main portion 2b (3b) and an extended portion 2c (3c). The extended portion 2c (3c) extends forward from the main portion 2b (3b) in the rotation direction X of the armature 4.

The main portion 2b (3b) extends in the circumferential direction and corresponds to the slot angle θ multiplied by four. In the fifth embodiment, the length of the main portion 2b (3b) corresponds to 120 degrees. The extended portion 2c (3c) extends in the circumferential direction and corresponds to the slot angle θ, which is 30 degrees. Therefore, the circumferential dimension of the magnet 2 (3) corresponds to the slot angle θ multiplied by five. In the fifth embodiment, the length of the magnet 2 (3) corresponds to 150 degrees.

A magnetic flux gradual change portion 2d (3d) is formed on the extended portion 2c (3c). The magnetic flux density of the magnetic flux gradual change portion 2d (3d) is minimum at the boundary between the main portion 2b (3b) and the extended portion 2c (3c) as shown by a curved line P in FIG. 12. The magnetic flux density gradually increases toward the rotation direction X of the armature 4 in the range within a predetermined angle δ2. The predetermined angle δ2 extends in the rotation direction X of the armature 4 from the boundary (see a curved line P3 in FIG. 12).

The reverse flux portion 2a is provided on the main portion 2b of the magnet 2. As in the second embodiment illustrated in FIGS. 6 and 7, the reverse flux portion 2a has a magnetic flux (a portion P4 in FIG. 12), the direction of which is opposite from that of the other part of the main portion 2b as shown by the curved line P in FIG. 12. The reverse flux portion 2a is located on the trailing side from the middle part of the magnet 2 in the rotation direction X of the armature 4. The reverse flux portion 2a is located substantially middle of the main portion 2b in the circumferential direction. As in the second embodiment illustrated in FIGS. 6 and 7, when the armature 4 rotates and the third brush 8 starts to establish a short circuit between an adjacent pair of the segments 12, the most advancing end of the first tooth 1st of a teeth group about which the coil 11 connected to the pair of the segments 12 is wound is aligned with the trailing end of the reverse flux portion 2a. In the fifth embodiment, the magnetic flux density of the reverse flux portion 2a is maximum at the middle part of the reverse flux portion 2a in the circumferential direction.

As shown in FIG. 11, an arc angle that corresponds to the circumferential dimension of the reverse flux portion 2a is referred to as θ2, an arc angle that corresponds to the circumferential dimension of the third brush 8 is referred to as θ3, and an arc angle that corresponds to the circumferential dimension of each segment 12 is referred to as θ4. When the third brush 8 starts to establish a short circuit between an adjacent pair of the segments 12, the third brush 8 is located within the range of a teeth group about which the coil 11 connected to the pair of the segments 12 is wound. In this state, a certain number of the teeth 10a in the teeth group are located on the advanced side of the third brush 8 in the rotation direction X of the armature 4. The number of the teeth 10a located at the advanced side is referred to as N1. The angle δ01 between the radial line L1, which extends through the middle of the reverse flux portion 2a in the circumferential direction, and the radial line L2, which extends through the middle of the third brush 8, is represented by the following equation.

$$\delta 01=(N1\times\theta 4)+(\theta 2/2)+(\theta 4-\theta 3)/2$$

In the fifth embodiment, the value of N1 is two as shown in FIG. 11.

Figure 13:
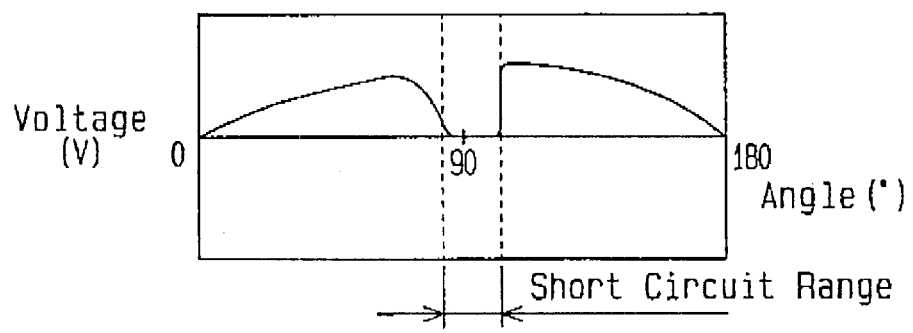
FIG. 13 is a graph showing the fluctuations of the voltage induced in one of the coil of the motor shown in FIG. 11.

FIG. 13 is a graph, which corresponds to the graph of FIG. 7, and shows the same result as FIG. 7. According to the graph of FIG. 13, when the armature 4 rotates by 90 degrees from the rotational angle position of zero degrees, the third brush 8 establishes a short circuit between an adjacent pair of the segments 12, to which one of the coils 11 is connected. While the short circuit is established, the most advancing end of the first tooth 1st in a teeth group about which the coil 11 connected to the pair of the segments 12 is wound passes the reverse flux portion 2a. At this time, a magnetic flux, which is generated in the reverse flux portion 2a, generates voltage in the coil 11. The voltage cancels the electromotive force, which is induced in the coil 11 due to a short circuit. As a result, the voltage generated in the coil 11 is substantially zero while a short circuit is established.

When the motor 1 is in a normal operation using the first and the second brushes 6, 7, the flowing direction of current through each coil 11 is switched after the first or the second brush 6, 7 establishes a short circuit between the corresponding adjacent pair of the segments 12, to which the coil 11 is connected. The period during which the coil 11 is short-circuited for switching the flowing direction of current, or for commutation, is referred to as the commutation period of the coil 11.

One of the coils 11 that is in the commutation period faces the extended portion 2c (3c), or a magnetic flux gradual change portion 2d (3d), of the magnet 2 (3). Specifically, during the commutation period, the most advancing end of the first tooth 1st of a teeth group that corresponds to the coil 11 passes the magnetic flux gradual change portion 2d (3d). The magnetic flux gradual change portion 2d (3d) gradually increases the magnetic flux toward the rotation direction X of the armature 4. Therefore, the amount of magnetic flux, which passes through the coil 11 in the commutation period gradually increases in accordance with the rotation of the armature 4. The rate of increase of the magnetic flux also increases gradually in accordance with the rotation of the armature 4. As a result, the voltage, which is induced in the coil 11, which is in the commutation period, is small during the commutation period and gradually increases in accordance with the rotational position of the armature 4. The induced voltage cancels the reactance voltage. This decreases undercommutation.

Figure 26:
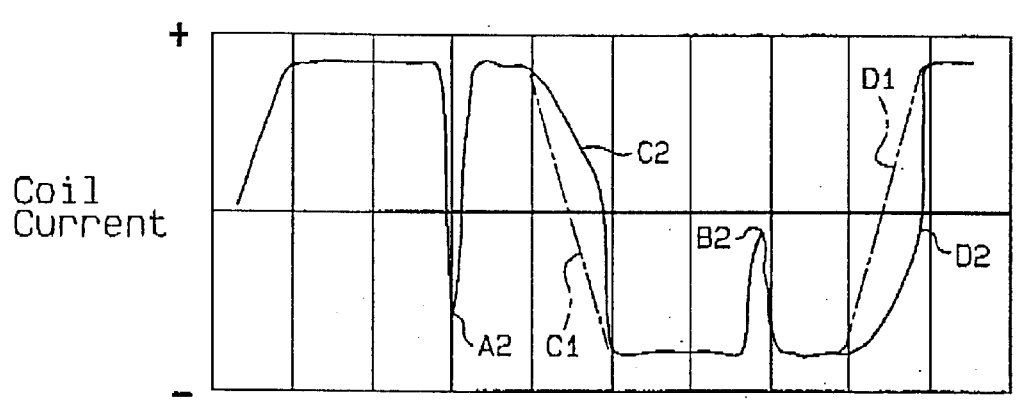
FIG. 26 is a graph showing the fluctuations of current that flows through one of the armature coils of a prior art direct-current motor.

According to a graph in FIG. 26, when the commutation is performed in one of the coils 11, change of the flowing direction of current is delayed and the current instantly changes at the termination of the commutation period in the prior art as shown by a continuous lines C2, D2. On the other hand, according to the fifth embodiment, the current smoothly changes during the commutation period and the commutation is reliably performed as shown by single-dotted lines C1, D1.

In the fifth embodiment, the reverse flux portion 2a is provided on the magnet 2. Therefore, the same advantages as the second embodiment illustrated in FIGS. 6, 7 are obtained. Particularly, in the fifth embodiment, the magnetic flux density of the reverse flux portion 2a is maximum at the middle part in the circumferential direction of the reverse flux portion 2a. Accordingly, compared to the second embodiment illustrated in FIGS. 6, 7, the electromotive force induced in the coil 11 due to a short circuit through the third brush 8 is more efficiently suppressed.

In this embodiment, the magnetic flux gradual, change portion 2d (3d) is formed on the extended portion 2c (3c) of the magnet 2 (3). As a result, the flowing direction of current smoothly changes during the commutation period of each coil 11 and the commutation is reliably performed.

Sixth Embodiment

A sixth embodiment of the present invention will now be described with reference to FIGS. 14 to 16. The differences from the fifth embodiment illustrated in FIGS. 11 to 13 will mainly be discussed below.

Figure 14:
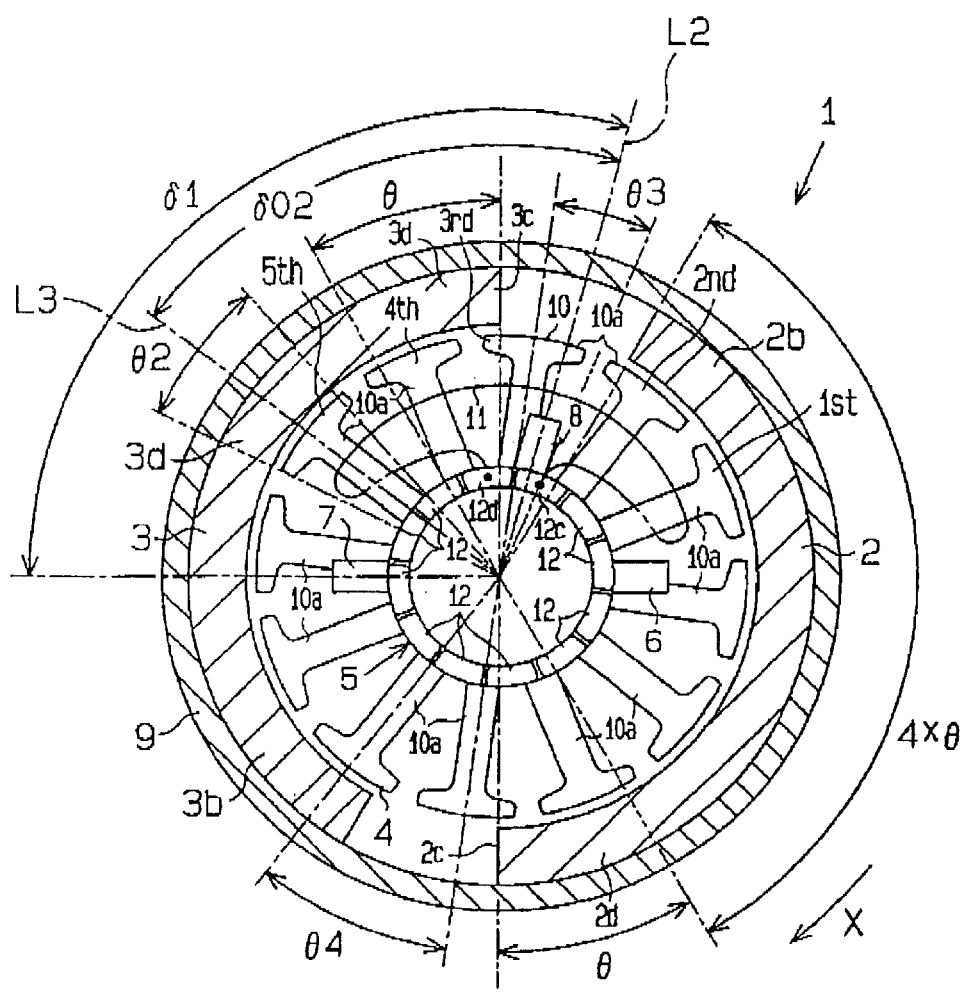
FIG. 14 is a cross-sectional view illustrating a direct-current motor according to a sixth embodiment of the present invention.
Figure 15:
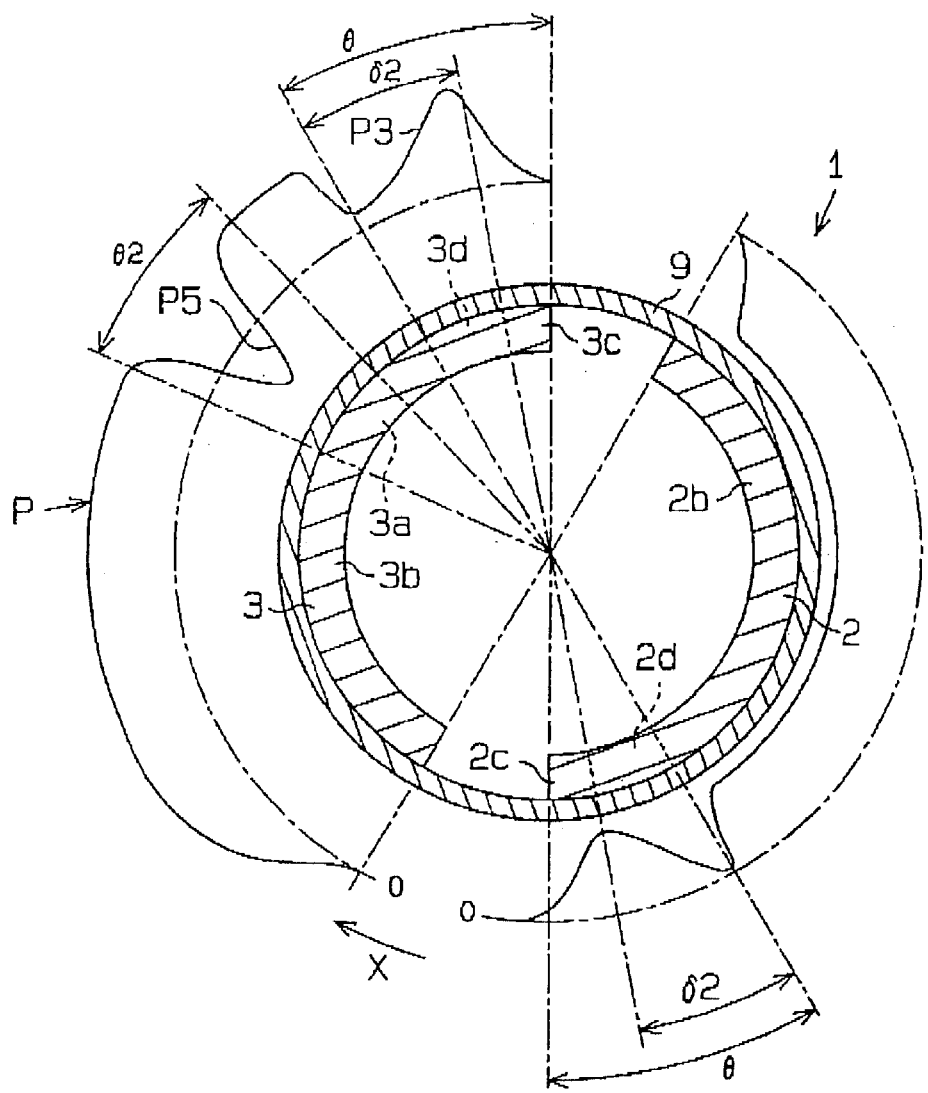
FIG. 15 is an explanatory diagram illustrating the magnetic flux distribution of the magnet provided in the motor shown in FIG. 14.

In the sixth embodiment, the reverse flux portion 3a is provided on the magnet 3 instead of the magnet 2 as shown in FIGS. 14 and 15. As shown by a curved line P in FIG. 15, the reverse flux portion 3a has a magnetic flux (a part P5 in FIG. 15), the direction of which is opposite from that of the other part of the main portion 3b. The reverse flux portion 3a is located on the advanced side from the middle part of the magnet 3 in the rotation direction X of the armature 4. When the armature 4 rotates and the third brush 8 starts to establish a short circuit between an adjacent pair of the segments 12 (12c, 12d in FIG. 8), the fifth tooth (most trailing tooth) 5th in a teeth group about which the coil 11 connected to the pair of the segments 12 is wound starts to separate from the reverse flux portion 3a. In other words, when the third brush 8 starts to establish a short circuit between an adjacent pair of the segments 12, the most trailing end of the fifth tooth 5th in a teeth group about which the coil 11 connected to the pair of the segments 12 is wound is aligned with the trailing end of the reverse flux portion 3a.

In the sixth embodiment, the structure of the reverse flux portion 3a is the same as that of the third embodiment illustrated in FIGS. 8 and 9.

As shown in FIG. 11, an arc angle that corresponds to the circumferential dimension of the reverse flux portion 3a is referred to as θ2, an arc angle that corresponds to the circumferential dimension of the third brush 8 is referred to as θ3, and an arc angle that corresponds to the circumferential dimension of each segment 12 is referred to as θ4. When the third brush 8 starts to establish a short circuit between an adjacent pair of the segments 12, the third brush 8 is located within the range of a teeth group about which the coil 11 connected to the pair of the segments 12 is wound. In this state, a certain number of the teeth 10a in the teeth group are located on the trailing side of the third brush 8 in the rotation direction X of the armature 4. The number of the teeth 10a located at the trailing side is referred to as N2. The angle δ02 between the radial line L3, which extends through the middle of the reverse flux portion 3a in the circumferential direction, and the radial line L2, which extends through the middle of the third brush 8, is represented by the following equation.

$$\delta 02=(N2\times\theta 4)+(\theta 2/2)+(\theta 4-\theta 3)/2$$

In the sixth embodiment, the value of N2 is three as shown in FIG. 14.

Figure 16:
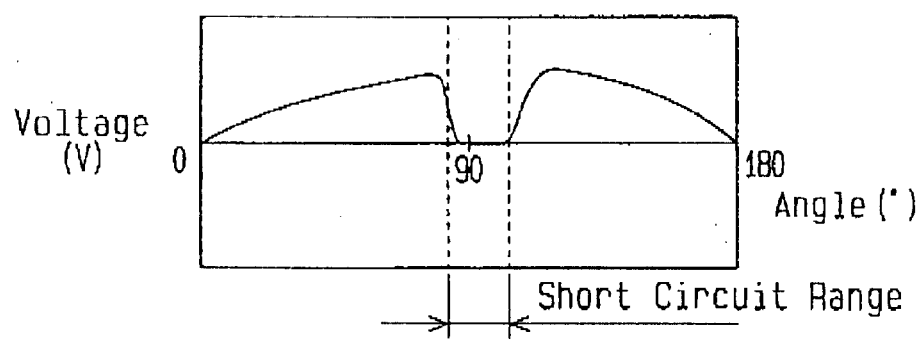
FIG. 16 is a graph showing the fluctuations of the voltage induced in one of the coil of the motor shown in FIG. 14.

FIG. 16 is a graph, which corresponds to the graph of FIG. 13, and shows the same result as FIG. 13. According to the graph of FIG. 16, when the armature 4 rotates by 90 degrees from the rotational angle position of zero degrees, the third brush 8 establishes a short circuit between an adjacent pair of the segments 12, to which one of the coils 11 is connected. While the short circuit is established, the fifth tooth 5th of a teeth group about which the coil 11 connected to the pair of the segments 12 is wound gradually separates from the reverse flux portion 3a. In other words, the most trailing end of the tooth bar of the fifth tooth 5th passes the reverse flux portion 3a. At this time, the magnetic flux, which is generated in the reverse flux portion 3a, generates voltage in the coil 11. The voltage cancels the electromotive force, which is induced in the coil 11 due to a short circuit. As a result, the voltage generated in the coil 11 is substantially zero while the short circuit is established.

Figure 12:
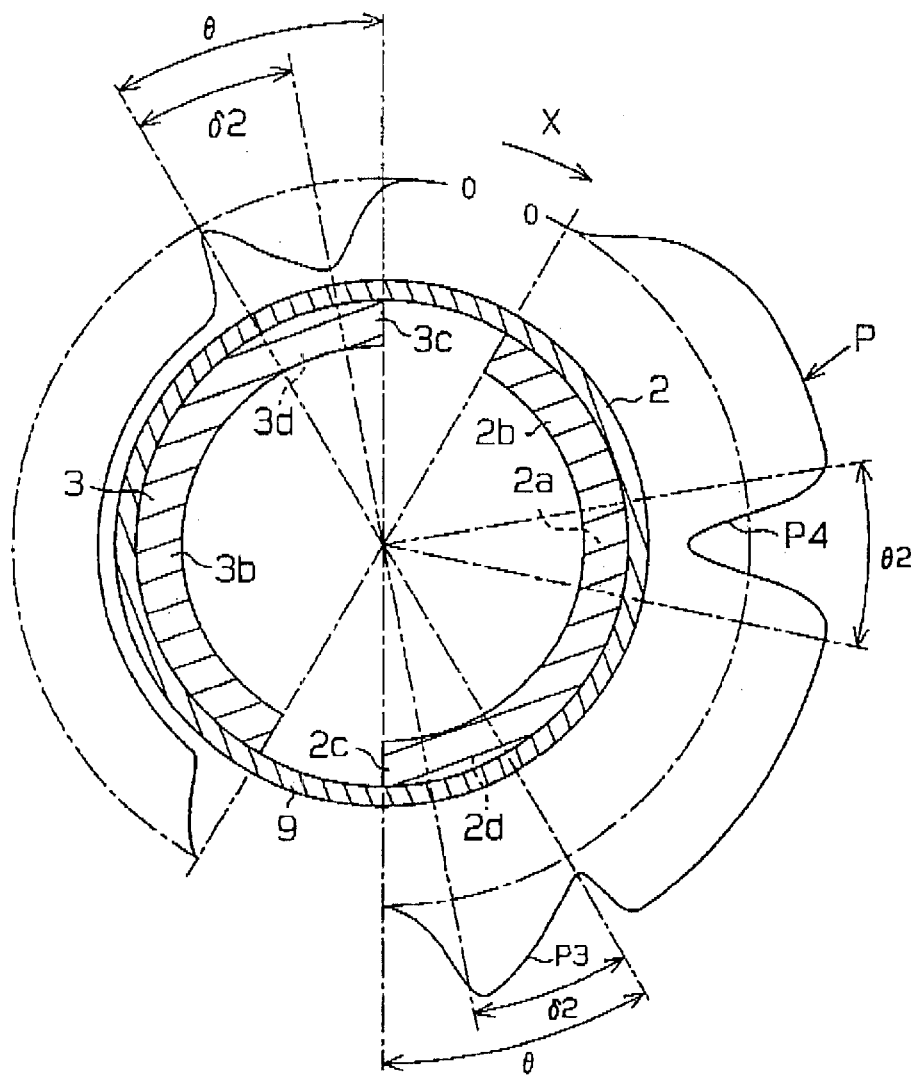
FIG. 12 is an explanatory diagram illustrating the magnetic flux distribution of the magnet provided in the motor shown in FIG. 11.

Therefore, the sixth embodiment also provides the same advantages as the fifth embodiment illustrated in FIGS. 11 to 13.

Seventh Embodiment

Figure 17:
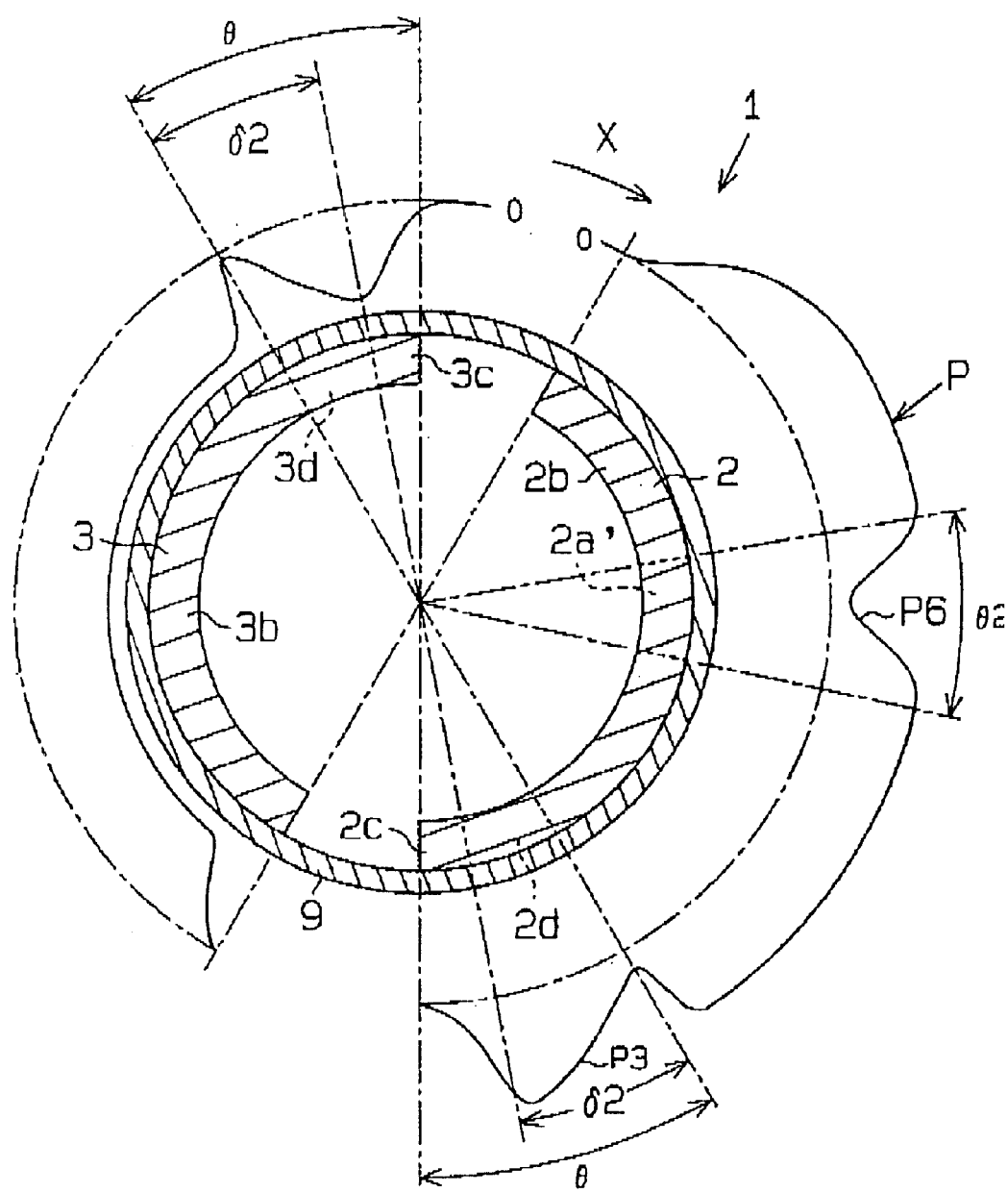
FIG. 17 is an explanatory diagram illustrating the magnetic flux distribution of a magnet provided in a direct-current motor according to a seventh embodiment of the present invention.

A seventh embodiment shown in FIG. 17 is a modification of the fifth embodiment illustrated in FIGS. 11 to 13. In the seventh embodiment, the weak flux portion 2a' is provided on the main portion 2b instead of the reverse flux portion 2a. As shown by a curved line P in FIG. 17, the weak flux portion 2a' generates a magnetic flux, the direction of which is the same as that of the magnetic flux generated in the other part of the main portion 2b. However, the magnetic flux density of the weak flux portion 2a' is less than the magnetic flux density of the other part of the main portion 2b (see a curved line P6 in FIG. 17). This structure also provides the same advantages as the fifth embodiment illustrated in FIGS. 11 to 13.

Eighth Embodiment

Figure 18:
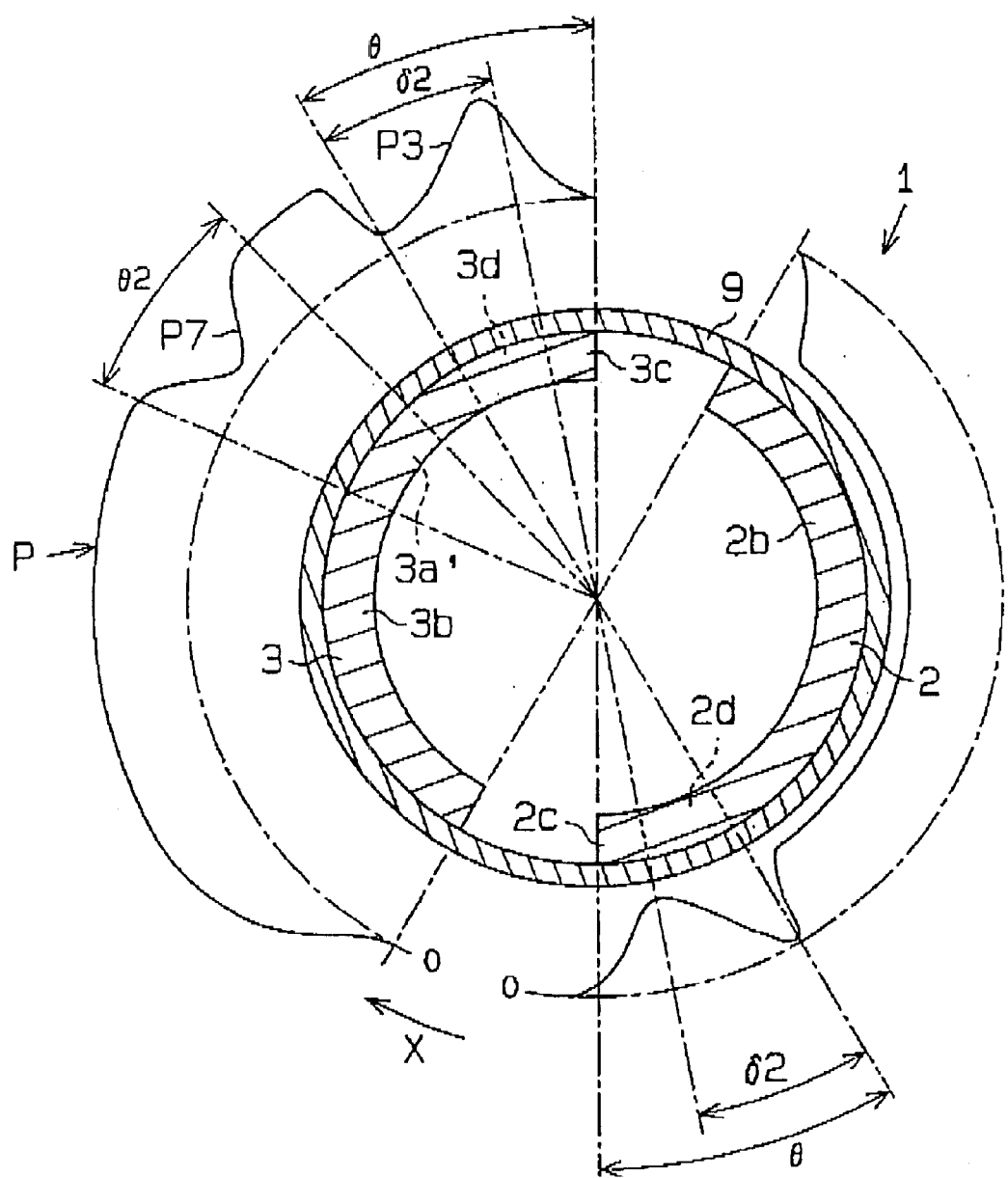
FIG. 18 is an explanatory diagram illustrating the magnetic flux distribution of a magnet provided in a direct-current motor according to an eighth embodiment of the present invention.

An eighth embodiment shown in FIG. 18 is a modification of the sixth embodiment illustrated in FIGS. 14 to 16. In the eighth embodiment, the weak flux portion 3a' is provided on the main portion 3b instead of the reverse flux portion 3a. As shown by a curved line P in FIG. 18, the weak flux portion 3a' generates a magnetic flux, the direction of which is the same as that of the magnetic flux generated in the other part of the main portion 3b. However, the magnetic flux density of the weak flux portion 3a' is less than the magnetic flux density of the other part of the main portion 3b (see a curved line P7 in FIG. 18). This structure also provides the same advantages as the sixth embodiment illustrated in FIGS. 11 to 13.

Figure 19:
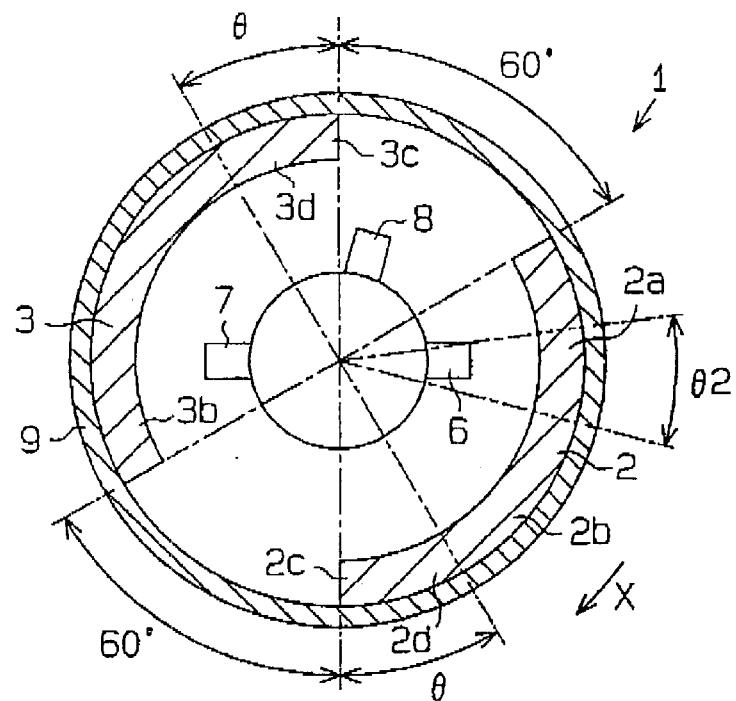
FIG. 19 is a cross-sectional view illustrating a schematic structure of a direct-current motor according to is a ninth embodiment of the present invention.

A ninth embodiment shown in FIG. 19 is a modification of the fifth embodiment illustrated in FIGS. 11 to 13. The main portion 2b (3b) of the magnet 2 (3) extends in the circumferential direction and corresponds to the slot angle θ multiplied by three. In the ninth embodiment, the length of the main portion 2b (3b) of the magnet 2 (3) corresponds to 90 degrees. Therefore, the circumferential dimension of the magnet 2 (3) corresponds to the slot angle θ multiplied by four. In the ninth embodiment, the length of the magnet 2 (3) corresponds to 120 degrees. The magnet 2 and the magnet 3 are spaced from each other by 60 degrees in the circumferential direction on both ends.

The sixth embodiment shown in FIGS. 14 to 16, may be structured as the ninth embodiment illustrated in FIG. 19.

Tenth Embodiment

Figure 20:
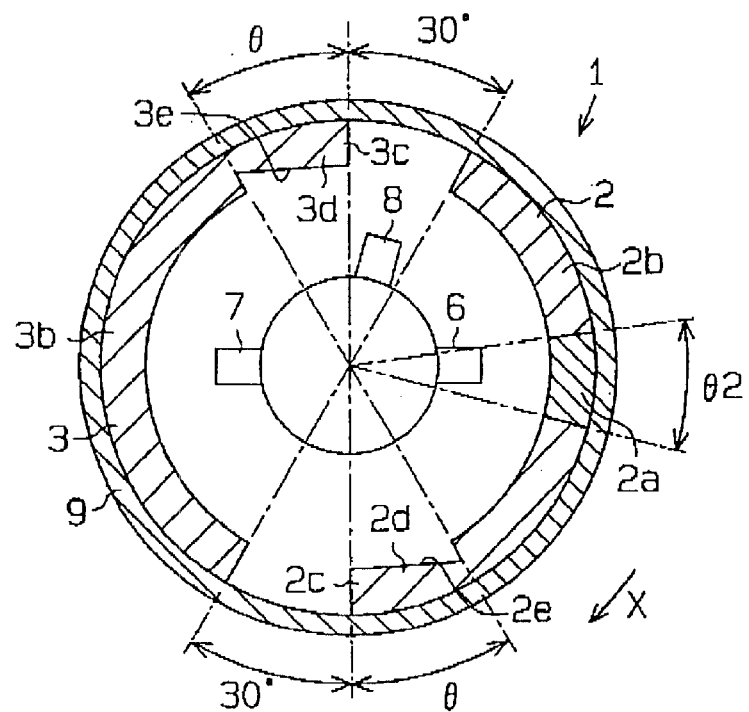
FIG. 20 is a cross-sectional view illustrating a schematic structure of a direct-current motor according to a tenth embodiment of the present invention.

A tenth embodiment shown in FIG. 20 is a modification of the fifth embodiment illustrated in FIGS. 11 to 13. In the tenth embodiment, a recess 2e (3e) is formed on the extended portion 2c (3c) of the magnet 2 (3). The radial thickness of the extended portion 2c (3c) gradually increases toward the rotation direction X of the armature 4. Thus, the magnetic flux gradual change portion 2d (3d) is formed on the extended portion 2c (3c). The main portion 2b of the magnet 2 is divided into two pieces. The reverse flux portion 2a, which is a separate piece, is arranged between the divided pieces of the main portion 2b.

The sixth embodiment shown in FIGS. 14 to 16, may be structured as the tenth embodiment illustrated in FIG. 20.

Eleventh Embodiment

Figure 21:
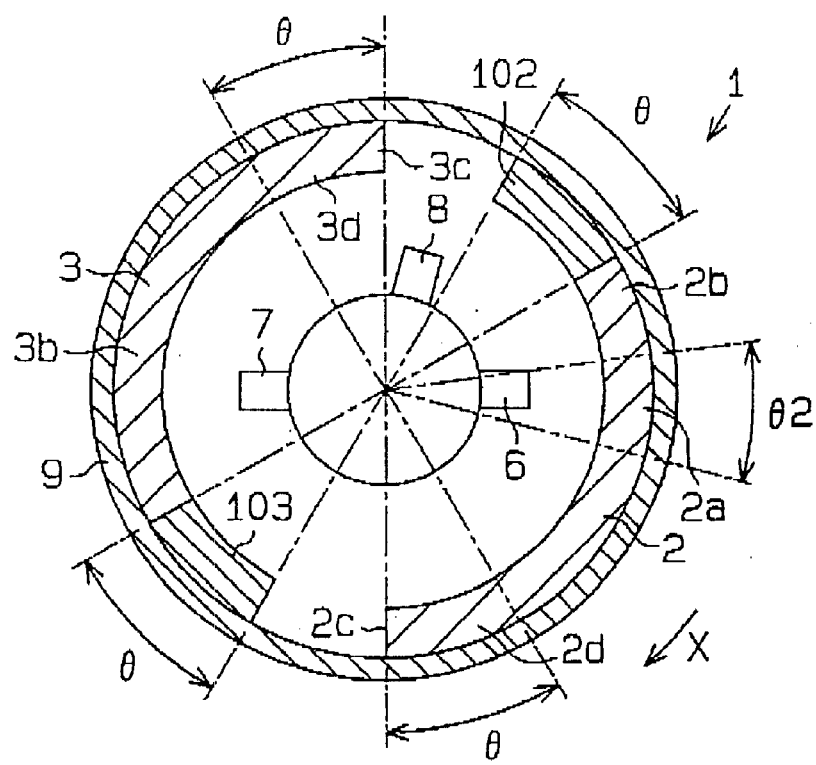
FIG. 21 is a cross-sectional view illustrating a schematic structure of a direct-current motor according to an eleventh embodiment of the present invention.

An eleventh embodiment shown in FIG. 21 is a modification of the fifth embodiment illustrated in FIGS. 11 to 13. In the eleventh embodiment, a ferromagnetic portion 102 (103), which is formed of material that has a great magnetic permeability such as mild steel, is located on the trailing end of the magnet 2 (3) in the rotation direction X of the armature 4. Specifically, the main portion 2b (3b) of the magnet 2 (3) extends in the circumferential direction and corresponds to the slot angle θ multiplied by three. In the eleventh embodiment, the circumferential dimension of the main portion 2b (3b) of the magnet 2 (3) corresponds to 90 degrees. The ferromagnetic portion 102 (103) extends in the circumferential direction and corresponds to the slot angle θ, which is 30 degrees in the eleventh embodiment. The ferromagnetic portion 102 (103) contacts the trailing end of the main portion 2b (5b) in the rotation direction X of the armature 4. The radial cross-section of the ferromagnetic portion 102 (103) is equivalent to that of the main portion 2b (3b).

Figure 22:
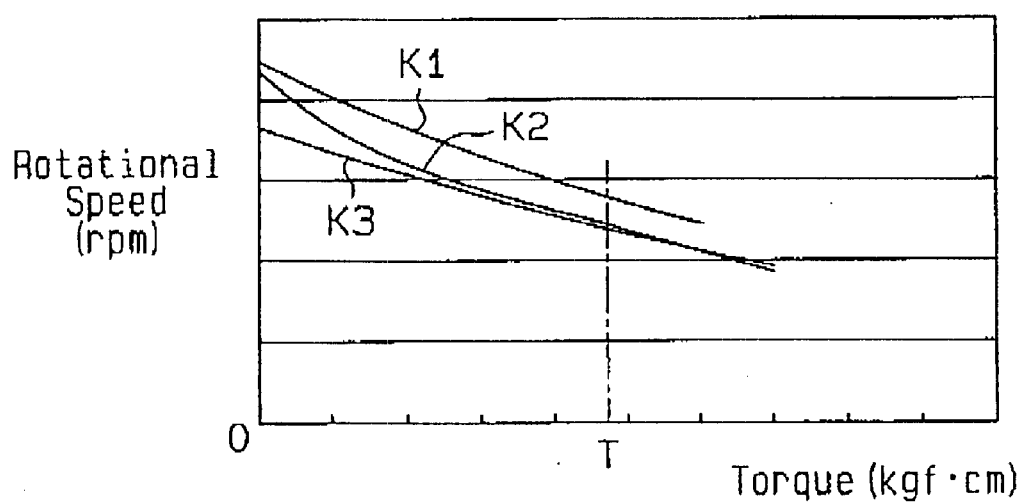
FIG. 22 is a graph showing the torque-motor characteristics of each motor shown in FIGS. 19 to 21.

FIG. 22 is a graph showing torque-motor characteristics of the motor 1 illustrated in FIGS. 19 to 21. A curved line K1 in the graph represents the characteristics of the motor 1 shown in FIG. 19. A curved line K2 in the graph represents the characteristics of the motor 1 shown in FIG. 21. A curved line K3 in the graph represents the characteristics of the motor 1 shown in FIG. 20. The rotational speed of the motor 1 shown in FIGS. 20 and 21 is less than that of the motor 1 shown in FIG. 19 to generate the same torque. That is, compared with the motor 1 shown in FIG. 19, the motor 1 shown in FIGS. 20 and 21 operates with less rotational speed to generate the same torque. However, since the magnet 2 (3) of the motor 1 shown in FIG. 20 is longer than the magnet 2 (3) of the motor 1 shown in FIG. 19, the motor 1 shown in FIG. 20 is more expensive than the motor 1 shown in FIG. 19. On the other hand, the main portion 2b (3b) of the magnet 2 (3) of the motor 1 shown in FIG. 21 is shorter than that of the motor 1 shown in FIG. 20. Instead of the long magnet 2 (3), the motor 1 shown in FIG. 21 is provided with the ferromagnetic portion 102 (103), which abuts against the main portion 2b (3b). The ferromagnetic portion 102 (103) acts as a magnet, thus amplifying the magnetic field. Furthermore, the ferromagnetic portion 102 (103) such as mild steel is inexpensive. Therefore, the motor 1 shown in FIG. 21 provides high performance and reduces cost.

The sixth embodiment shown in FIGS. 14 to 16, may be structured as the eleventh embodiment illustrated in FIG. 21.

Twelfth Embodiment

Figure 23:
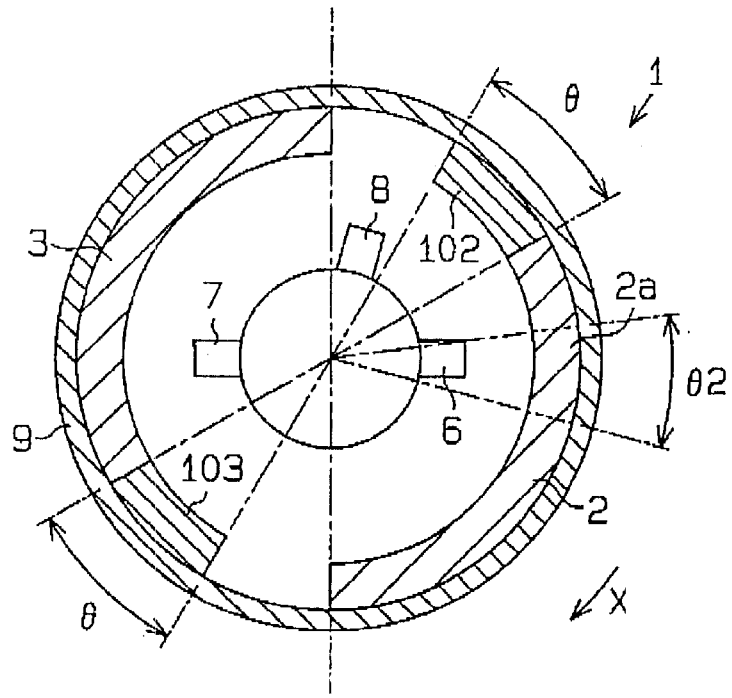
FIG. 23 is a cross-sectional view illustrating a schematic structure of a direct-current motor according to a twelfth embodiment of the present invention.

A twelfth embodiment shown in FIG. 23 is an example of a structure according to the eleventh embodiment shown in FIG. 21 being applied to a motor that has the magnet 2 (3) without the extended portion 2c (3c), or the magnetic flux gradual change portion 2d (3d).

Thirteenth Embodiment

Figure 24:
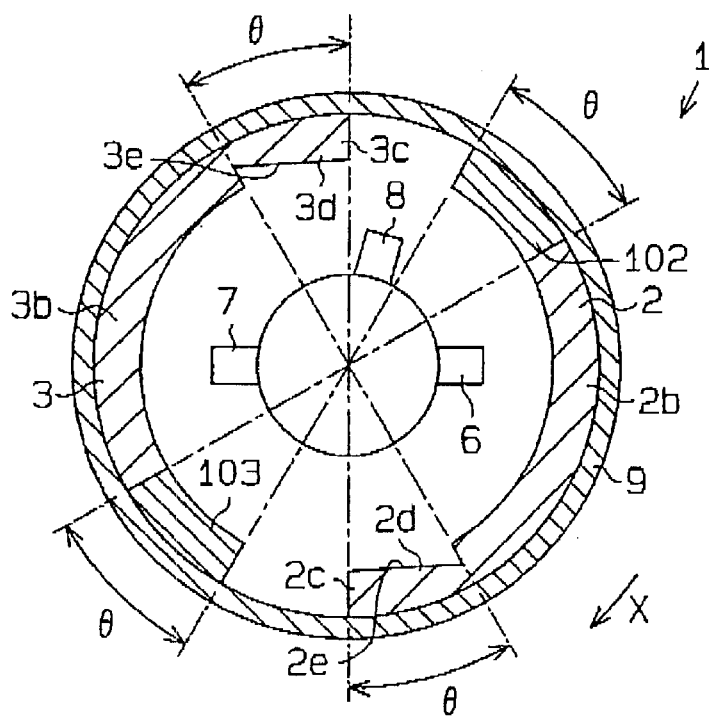
FIG. 24 is a cross-sectional view illustrating a schematic structure of a direct-current motor according to a thirteenth embodiment of the present invention.

A thirteenth embodiment shown in FIG. 24 is an example of eleventh embodiment shown in FIG. 21 being applied to the motor that has the magnet 2 (3) without the reverse flux portion 2a (3a) or the weak flux portion 2a' (3a'). In the example shown in FIG. 24, the magnetic flux gradual change portion 2d (3d) forms the recess 2e (3e) on the extended portion 2c (3c) of the magnet 2 (3) as in the tenth embodiment shown in FIG. 20.

Fourteenth Embodiment

Figure 25:
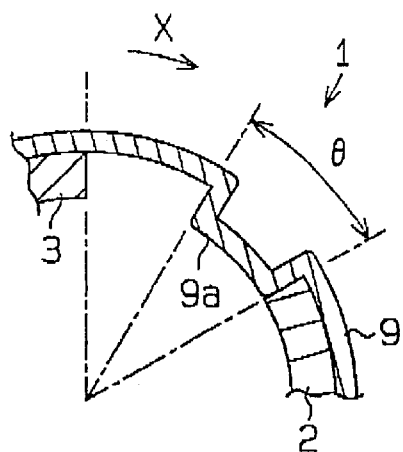
FIG. 25 is a partial cross-sectional view illustrating a schematic structure of a direct-current motor according to a fourteenth embodiment of the present invention.

A fourteenth embodiment shown in FIG. 25 is a modification of the embodiments shown in FIGS. 21 to 24. In the fourteenth embodiment, the ferromagnetic portion is integrally formed on the motor housing yoke 9. That is, as shown in FIG. 25, parts of the motor housing yoke 9 are deformed radially inward by pressing. This forms projections 9a, which function as the ferromagnetic portions. Each projection 9a contacts the trailing end of the corresponding magnet 2, 3 in the rotation direction X of the armature 4. The radially inward circumferential surface of each projection 9a is aligned with the radially inward circumferential surface of the corresponding magnet 2, 3. Since the projections 9a, or the ferromagnetic portions 9a, are integrally formed on the motor housing yoke 9, the number of parts is reduced. Thus, the cost of the motor 1 is reduced.

The embodiments of the present invention may be modified as follows.

One of the magnets 2, 3 may include a magnetic flux change portion that is different from the reverse flux portion 2a (3a) or the weak flux portion 2a' (3a'). For example, a member that has greater magnetic permeability than the magnet 2 (3), such as mild steel, may be located in the middle of the magnet 2 (3) along the circumferential direction. In this case, the magnetic flux of the position that corresponds to the mild steel member is weaker than the magnetic flux of the position that corresponds to the magnet 2 (3). Alternatively, a thin portion may be provided in the middle of one of the magnets 2, 3 along the circumferential direction. In this case, the thin portion functions as a weak flux portion. Furthermore, a recess or a bore may be provided in the middle of one of the magnets 2, 3 along the circumferential direction, or one of the magnets 2, 3 may be divided into two pieces and space may be provided in between. In this case, the magnetic flux of the position that corresponds to the recess, the bore, or the space is weaker than the position that corresponds to the magnet 2 (3).

In the first embodiment illustrated in FIGS. 1 to 5, the angle $\delta$ between the third brush 8 and the first brush 6 may be an obtuse angle. In this case, the position of the reverse flux portion 2a is changed in accordance with the position of the third brush 8. Also, in the first embodiment shown in FIGS. 1 to 5, the third brush 8 may be spaced apart from the first brush 6 by a predetermined angle $\delta$ (an obtuse or acute angle) toward the opposite direction with respect to the rotation direction X of the armature 4. In this case, the reverse flux portion is provided on the magnet 3. The position of the third brush 8 may also be altered in the embodiments other than the first embodiment shown in FIGS. 1 to 5.

The circumferential dimension of the magnet 2 (3) may be altered to any length other than that of the embodiments illustrated in the figures.

In the embodiments illustrated in FIGS. 21 to 25, the ferromagnetic portion may be formed by a material that has a great magnetic permeability other than the mild steel. Furthermore, the cross-section of the ferromagnetic portion may be different from that of the magnet 2 (3).

A number of third brushes 8 may be provided.

The number of teeth 10a may be other than twelve. The number of teeth 10a about which a coil 11 is wound may be other than five.

The present invention may be used in a direct-current motor other than the wiper motor.

Therefore, the present examples and embodiments are to be considered as illustrative and not restrictive and the invention is not to be limited to the details given herein, but may be modified within the scope and equivalence of the appended claims.

What is claimed is:

1. A direct-current motor, comprising:
    an armature, which includes a core and a plurality of coils, wherein the core has a plurality of teeth, which are spaced apart by a predetermined angular pitch, wherein the teeth form a plurality of teeth groups, each of which includes a predetermined number of teeth, wherein the tooth that is at the most advancing end in each teeth group in the rotation direction of the armature is the most advancing tooth, and wherein each coil is wound about one of the teeth groups;
    a commutator, which integrally rotates with the armature, wherein the commutator includes a plurality of segments, and each coil is connected to an adjacent pair of the segments;
    a first brush, a second brush, and a third brush, which are arranged about the rotational axis of the armature at predetermined angular intervals, wherein the brushes can contact each segment to supply current to the coils through the segments, wherein, when current is supplied to the coils through the first brush and the second brush, the armature is rotated in a first mode, and wherein, when current is supplied to the coils through the second brush and the third brush, the armature is rotated in a second mode; and
    a pair of magnets, which face each other with the armature in between, wherein one of the magnets has a magnetic flux change portion at a circumferential section of the magnet, wherein, when the third brush starts to establish a short circuit between an adjacent pair of the segments during the rotation of the armature, the most advancing end of the most advancing tooth in the teeth group that corresponds to the coil connected to the pair of the segments starts circumferentially overlapping the magnetic flux change portion, and wherein the circumferential dimension of the magnetic flux portion corresponds to the angle by which the armature rotates while the third brush establishes a short circuit between an adjacent pair of the segments.

2. The direct-current motor according to claim 1, wherein the magnetic flux change portion is a reverse flux portion, wherein the reverse flux portion generates a magnetic flux in the opposite direction to the direction of the magnetic flux generated in the other part of the magnet.

3. The direct-current motor according to claim 2, wherein the reverse flux portion generates the greatest magnetic flux at the middle part in the circumferential direction.

4. The direct-current motor according to claim 1, wherein the magnetic flux change portion is a weak flux portion, wherein the weak flux portion generates a weaker magnetic flux than the magnetic flux generated in the other part of the magnet.

5. The direct-current motor according to claim 4, wherein the weak flux portion generates the weakest magnetic flux at the middle part in the circumferential direction.

6. A direct-current motor, comprising:
    an armature, which includes a core and a plurality of coils, wherein the core has a plurality of teeth, which are spaced apart by a predetermined angular pitch, wherein the teeth form a plurality of teeth groups, each of which includes a predetermined number of teeth, wherein the tooth that is at the most trailing end in each teeth group in the rotation direction of the armature is the most trailing tooth, and wherein each coil is wound about one of the teeth groups;
    a commutator, which integrally rotates with the armature, wherein the commutator includes a plurality of segments, and each coil is connected to an adjacent pair of the segments;
    a first brush, a second brush, and a third brush, which are arranged about the rotational axis of the armature at predetermined angular intervals, wherein the brushes can contact each segment to supply current to the coils through the segments, wherein, when current is supplied to the coils through the first brush and the second brush, the armature is rotated in a first mode, and wherein, when current is supplied to the coils through the second brush and the third brush, the armature is rotated in a second mode; and a pair of magnets, which face each other with the armature in between, wherein one of the magnets has a magnetic flux change portion at a circumferential section of the magnet wherein, when the third brush starts to establish a short circuit between an adjacent pair of the segments during the rotation of the armature, the most trailing end of the most trailing tooth in the teeth group that corresponds to the coil connected to the pair of the segments starts circumferentially overlapping the magnetic flux change portion, and wherein the circumferential dimension of the magnetic flux portion corresponds to the angle by which the armature rotates while the third brush establishes a short circuit between an adjacent pair of the segments.

7. The direct-current motor according to claim 6, wherein the magnetic flux change portion is a reverse flux portion, wherein the reverse flux portion generates a magnetic flux in the opposite direction to the direction of the magnetic flux generated in the other part of the magnet.

8. The direct-current motor according to claim 7, wherein the reverse flux portion generates the greatest magnetic flux at the middle part in the circumferential direction.

9. The direct-current motor according to claim 6, wherein the magnetic flux change portion is a weak flux portion, wherein the weak flux portion generates a weaker magnetic flux than the magnetic flux generated in the other part of the magnet.

10. The direct-current motor according to claim 9, wherein the weak flux portion generates the weakest magnetic flux at the middle part in the circumferential direction.

11. A direct-current motor, comprising:

an armature, which includes a core and a plurality of coils, wherein the core has a plurality of teeth, which are spaced apart by a predetermined angular pitch, wherein the teeth form a plurality of teeth groups, each of which includes a predetermined number of teeth, wherein the tooth that is at the most advancing end in each teeth group in the rotation direction of the armature is the most advancing tooth, and wherein each coil is wound about one of the teeth groups;

a commutator, which integrally rotates with the armature, wherein the commutator includes a plurality of segments, and each coil is connected to an adjacent pair of the segments;

a first brush, a second brush, and a third brush, which are arranged about the rotational axis of the armature at predetermined angular intervals, wherein the brushes can contact each segment to supply current to the coils through the segments, wherein, when current is supplied to the coils through the first brush and the second brush, the armature is rotated in a first mode, and wherein, when current is supplied to the coils through the second brush and the third brush, the armature is rotated in a second mode; and a pair of magnets, which face each other with the armature in between, wherein each magnet includes a main portion and an extended portion, which extends from the main portion, wherein the extended portion includes a first magnetic flux change portion, wherein the magnetic flux at the first magnetic flux change portion gradually increases toward the rotation direction of the armature; and a second magnetic flux change portion, which extends circumferentially in a part of one of the main portions, wherein, when the third brush starts to establish a short circuit between an adjacent pair of the segments during the rotation of the armature, the most advancing end of the most advancing tooth in the teeth group that corresponds to the coil connected to the pair of the segments starts circumferentially overlapping the magnetic flux change portion.

12. The direct-current motor according to claim 11, wherein the second magnetic flux change portion is a reverse flux portion, wherein the reverse flux portion generates a magnetic flux in the opposite direction to the direction of the magnetic flux generated in the other part of the main portion.

13. The direct-current motor according to claim 12, wherein the reverse flux portion generates the greatest magnetic flux at the middle part in the circumferential direction.

14. The direct-current motor according to claim 11, wherein a ferromagnetic portion, which is formed of material that has a great magnetic permeability, is arranged to contact the trailing end of each magnet with respect to the rotation direction of the armature.

15. The direct-current motor according to claim 14, further comprising a motor housing yoke, which accommodates the armature, wherein the ferromagnetic portion is formed by deforming the motor housing yoke radially inward.

16. A direct-current motor, comprising:

an armature, which includes a core and a plurality of coils, wherein the core has a plurality of teeth which are spaced apart by a predetermined angular pitch, wherein the teeth form a plurality of teeth groups, each of which includes a predetermined number of teeth, wherein the tooth that is at the most trailing end in each teeth group in the rotation direction of the armature is the most trailing tooth, and wherein each coil is wound about one of the teeth groups;

a commutator, which integrally rotates with the armature, wherein the commutator includes a plurality of segments, and each coil is connected to an adjacent pair of the segments;

a first brush, a second brush, and a third brush, which are arranged about the rotational axis of the armature at predetermined angular intervals, wherein the brushes can contact each segment to supply current to the coils through the segments, wherein, when current is supplied to the coils through the first brush and the second brush, the armature is rotated in a first mode, and wherein, when current is supplied to the coils through the second brush and the third brush, the armature is rotated in a second mode; and a pair of magnets, which face each other with the armature in between, wherein each magnet includes a main portion and an extended portion, which extends from the main portion, wherein the extended portion includes a first magnetic flux change portion, wherein the magnetic flux at the first magnetic flux change portion gradually increases toward the rotation direction of the armature; and a second magnetic flux change portion, which extends circumferentially in a part of one of the main portions, wherein, when the third brush starts to establish a short circuit between an adjacent pair of the segments during the rotation of the armature, the most trailing end of the most trailing tooth in the teeth group that corresponds to the coil connected to the pair of the segments starts circumferentially overlapping the magnetic flux change portion.

17. The direct-current motor according to claim 16, wherein the second magnetic flux change portion is a reverse flux portion, wherein the reverse flux portion generates a magnetic flux in the opposite direction to the direction of the magnetic flux generated in the other part of the main portion.

18. The direct-current motor according to claim 17, wherein the reverse flux portion generates the greatest magnetic flux at the middle part in the circumferential direction.

19. The direct-current motor according to claim 16, wherein a ferromagnetic portion, which is formed of material that has a great magnetic permeability, is arranged to contact the trailing end of each magnet with respect to the rotation direction of the armature.

20. The direct-current motor according to claim 19, further comprising a motor housing yoke, which accommodates the armature, wherein the ferromagnetic portion is formed by deforming the motor housing yoke radially inward.

21. A manufacturing method of a direct-current motor, the motor comprising:

an armature, which includes a core and a plurality of coils;

a commutator, which integrally rotates with the armature, wherein the commutator includes a plurality of segments, and each coil is connected to an adjacent pair of the segments;

a first brush, a second brush, and a third brush, which are arranged about the rotational axis of the armature at predetermined angular intervals, wherein the brushes can contact each segment to supply current to the coils through the segments, wherein, when current is supplied to the coils through the first brush and the second brush, the armature is rotated in a first mode, and wherein, when current is supplied to the coils through the second brush and the third brush, the armature is rotated in a second mode; and a pair of magnets, which face each other with the armature in between, the manufacturing method comprising:

a first polarization process, wherein the magnets are exposed to a part of a magnetic field having a generally uniform direction and a generally uniform force, so that the magnets have the magnetic flux having a generally uniform direction and a generally uniform force; and a second polarization process, wherein a part of one of the magnets is exposed to a part of a magnetic field having a generally opposite direction to the magnetic field generated in tho first polarization process, thus forming a magnetic flux change portion at a circumferential section of the magnet, wherein the magnetic flux generated in the magnetic flux change portion suppresses the electromotive force induced in the coil due to a short circuit established between an adjacent pair of the segments by the third brush during the rotation of the armature in the first mode.

22. The manufacturing method according to claim 21, wherein the second polarization process includes exposing only a predetermined circumferential dimension of one of the magnets to the magnetic field, wherein the circumferential dimension corresponds to the angle by which the armature rotates while the third brush establishes a short circuit between an adjacent pair of the segments.

* * * * *

UNITED STATES PATENT AND TRADEMARK OFFICE
CERTIFICATE OF CORRECTION

PATENT NO.    : 6,580,237 B2
DATED         : June 17, 2003
INVENTOR(S)   : Hiroyuki Harada et al.

It is certified that error appears in the above-identified patent and that said Letters Patent is hereby corrected as shown below:

<u>Column 22,</u>
Line 18, delete "tho" and insert therefor -- the --.

Signed and Sealed this

Ninth Day of December, 2003

JAMES E. ROGAN
*Director of the United States Patent and Trademark Office*